US012617616B2

(12) United States Patent (10) Patent No.: US 12,617,616 B2
Cass et al. (45) Date of Patent: May 5, 2026

(54) ARTIFICIAL INTELLIGENCE BIN RECOVERY TECHNIQUE AND DOWNTIME MITIGATION

(71) Applicant: Bastian Solutions, LLC, Indianapolis, IN (US)

(72) Inventors: Mark R Cass, Boise, ID (US); Amey Sunil Kulkarni, Boise, ID (US); Shelby Lynne Cass, Corvallis, OR (US); Eric Michael Smith, Dallas, TX (US); Paola Andrea Gutierrez Guzman, Boise, ID (US); Ruthvik Vaila, Boise, ID (US)

(73) Assignee: Bastian Solutions, LLC, Indianapolis, IN (US)

( * ) Notice: Subject to any disclaimer, the term of this patent is extended or adjusted under 35 U.S.C. 154(b) by 416 days.

(21) Appl. No.: 18/363,268

(22) Filed: Aug. 1, 2023

(65) Prior Publication Data

US 2025/0042662 A1    Feb. 6, 2025

(51) Int. Cl.
B65G 1/137 (2006.01)
B25J 9/16 (2006.01)
B25J 19/02 (2006.01)

(52) U.S. Cl.
CPC .......... B65G 1/1373 (2013.01); B25J 9/1612 (2013.01); B25J 9/1697 (2013.01); B25J 19/023 (2013.01)

(58) Field of Classification Search
CPC ...... B25J 19/023; B25J 9/1612; B25J 9/1697; B65G 1/1373
See application file for complete search history.

(56) References Cited

U.S. PATENT DOCUMENTS

| | | | | |
|---|---|---|---|---|
| 6,328,523 | B1 * | 12/2001 | Watanabe | .............. B25J 9/1697 |
| | | | | 414/811 |
| 7,313,464 | B1 * | 12/2007 | Perreault | ................ B25J 9/1666 |
| | | | | 700/262 |
| 8,862,269 | B2 * | 10/2014 | Martinez | ................ B25J 9/1697 |
| | | | | 700/250 |
| 9,079,308 | B2 * | 7/2015 | Martinez | ................ B25J 13/085 |
| 10,029,851 | B1 * | 7/2018 | Durham | .............. B65G 1/1373 |
| 10,360,531 | B1 * | 7/2019 | Stallman | .............. G06Q 10/087 |

(Continued)

FOREIGN PATENT DOCUMENTS

| | | | | |
|---|---|---|---|---|
| CA | 3111560 A1 * | 3/2020 | ....... G01N 35/00732 |
| JP | 2013082054 A * | 5/2013 | |

(Continued)

*Primary Examiner* — Babar Sarwar
(74) *Attorney, Agent, or Firm* — Woodard, Emhardt, Henry, Reeves & Wagner, LLP

(57)    ABSTRACT

A system includes one or more robot arms configured to pick and/or place items into totes. The system is designed to reduce overall downtime. In the system, if the robot arm is unable to pick and/or place items into the tote, the system routes the tote to a human operator who rearranges the items in the tote in such a way that the robot arm is more likely to be able to pick the items from the tote. The system further includes an artificial intelligence (AI) system that determines whether totes are able to be picked by the robot arm. The AI system further monitors the operation of the robot arms and human operators for training purposes. The data from picking and rearranging operations are used to train the AI system.

17 Claims, 8 Drawing Sheets

(56)  References Cited

U.S. PATENT DOCUMENTS

| | | | | |
|---|---|---|---|---|
| 11,007,648 B2 * | 5/2021 | Wertenberger | ........ | B25J 9/1697 |
| 2016/0244262 A1 * | 8/2016 | O'Brien | ..................... | B25J 9/16 |
| 2017/0362039 A1 * | 12/2017 | Eisenberg | ............. | B65G 47/46 |
| 2020/0242544 A1 * | 7/2020 | Galluzzo | ................ | B25J 9/1692 |
| 2020/0269429 A1 * | 8/2020 | Chavez | ................. | B25J 9/1687 |
| 2021/0032031 A1 * | 2/2021 | Kalouche | ............. | B65G 1/0464 |
| 2021/0069904 A1 * | 3/2021 | Duan | ....................... | B25J 9/161 |
| 2022/0348409 A1 * | 11/2022 | Sun | .......................... | B07C 5/36 |
| 2023/0389250 A1 * | 11/2023 | Nakamura | ............. | B25J 9/1697 |
| 2025/0123623 A1 * | 4/2025 | Jinandra | ............... | G05D 1/667 |

FOREIGN PATENT DOCUMENTS

| | | | | | |
|---|---|---|---|---|---|
| JP | 2018008343 A | * | 1/2018 | | |
| WO | WO-2021122218 A1 | * | 6/2021 | ........... | B65G 1/1371 |

* cited by examiner

600

705 — Monitor robot and human operator activity

710 — Determine active/idle status for robot and human operators

715 — Route totes to robot and human operators that are idle

805  Record activity of robot or human operator

810  Determine success/failure of activity

815  Label recorded activity data as success/failure

820  Save labeled activity data for training

825  Distribute activity data across network

830  Train robots using tote activity data

ARTIFICIAL INTELLIGENCE BIN RECOVERY TECHNIQUE AND DOWNTIME MITIGATION

BACKGROUND

Facilities with various purposes utilize both human and robotic operators to perform tasks. For example, a facility utilizes both human and robotic operators to perform tasks related to storage, inventory management, manufacturing, fulfilling orders, and/or other purposes. It can be dangerous for human operators to interact with robotic operators during normal operations. The speed and efficiency of operations within such facilities may be reduced in order to operate safely.

Thus, there is a need for improvement in this field.

SUMMARY

System uptime is always a concern with automated material handling systems like robotic equipment. Unfortunately, robotic equipment is sometimes unable to pick a bin and/or other product carrier. For example, sometimes the bins get jostled and/or otherwise disorganized so that there are no pick locations for the robot. When such a fault occurs, a human usually has to enter the work area of the robotic equipment to remove and/or rearrange the bin or take some other physical corrective action to address the situation. As should be appreciated, having a human enter the work area creates production downtime, which can become costly. Furthermore, having a human enter the work area can be quite dangerous, and as a result, safety precautions must be taken which can lead to further downtime.

A unique automated downtime mitigation system has been developed to handle such faults as well as other issues during the material handling process. The system is configured to automatically determine a bin status and act in a predetermined manner based on the determined bin status. For example, the system is configured to automatically route unpickable bins to a human operator for reorganization. In another example, the system is configured to automatically route unpickable bins to a robot for reorganization. In yet another example, the system is configured to determine the probability of a successful bin pick and rank the bins based on the probability. For example, the system then routes bins with the highest pick probability to the robot and routes bins with the lowest pick probability to a human and/or robot for reorganization. Furthermore, the system is configured to handle the faults without a pause and/or stop in the material handling process such that system downtime is mitigated.

The automated downtime mitigation system includes an artificial intelligence (AI) system configured to determine the bin status. In one example, the AI system is configured to work with one or more cameras. For example, the cameras are configured to monitor one or more bins as they approach the pick location. In one embodiment, the system determines that the bin is pickable and continues through the material handling system without issue. In another embodiment, the system routes the bin to a human operator for remediation and/or reorganization. After the operator reorganizes the bin, the bin is placed back into the material handling system for picking. In one example, the system includes a physical indicator of proper bin arrangement. For example, the system includes an indicator light and/or alert message. As should be appreciated, the system is configured to automatically route the unpickable bin to a human operator without stopping and/or slowing the material handling system. Thus, system downtime is mitigated.

The AI system is further configured to capture and label imaging data during bin picking and rearrangement for use in AI training, AI testing, and system optimization. In one embodiment, the AI system records data while monitoring the robotic arm. For example, the AI system records data about the movement of a robotic arm during a successful pick operation and labels the movement as successful. In another embodiment, the AI system monitors human operators picking or reorganizing items in a bin. For example, the AI system records and learns each step that a human operator takes to orient an item in a bin.

Machine learning is used to train the system based on data recorded during bin picking operations. For example, a neural network is used to train the AI system using data from successful and/or failed pick operations. Testing may be performed on the AI system, and recorded testing data may be used for additional training of the AI system. For example, the AI system performs testing by attempting to pick randomized items from different bins using the robotic arms. The recorded data may be distributed among multiple robots. For example, the system is configured to propagate image data to all robots via a wireless communication system to provide AI training for new and/or replacement robots. In another embodiment, the data may be transferred to a centralized computer to train the AI system.

In another embodiment, the system monitors operator/robot downtime. Based on the status of an operator/robot (e.g., idle and/or active), the system routes bins for reorganization to idle operators/robots to mitigate system downtime. The AI system is further configured to estimate the probability of a successful robot bin rearrangement. For example, the bin is routed to a robot for rearrangement only if the probability of success is above a threshold value. In another embodiment, the AI system may facilitate a bin rearrangement by a human operator by displaying images of a similar bin in a correctly arranged configuration.

The system and techniques as described and illustrated herein concern a number of unique and inventive aspects. Some, but by no means all, of these unique aspects are summarized below.

Aspect 1 generally concerns a system.

Aspect 2 generally concerns the system of any previous aspect including a robot.

Aspect 3 generally concerns the system of any previous aspect in which the robot is configured to pick from and/or place into a tote one or more items.

Aspect 4 generally concerns the system of any previous aspect in which the robot is configured to learn how to pick from and/or place into the tote the items based on captured image data.

Aspect 5 generally concerns the system of any previous aspect in which the robot includes a robot arm and an end effector coupled to the robot arm.

Aspect 6 generally concerns the system of any previous aspect in which the end effector is configured to hold the items.

Aspect 7 generally concerns the system of any previous aspect including a camera.

Aspect 8 generally concerns the system of any previous aspect in which the camera is configured to monitor status of the tote.

Aspect 9 generally concerns the system of any previous aspect in which the camera is configured to capture one or more images of the items in the tote.

Aspect 10 generally concerns the system of any previous aspect in which the camera includes a robot camera.

Aspect 11 generally concerns the system of any previous aspect in which the robot camera is positioned proximal to the robot.

Aspect 12 generally concerns the system of any previous aspect in which the robot camera is configured to capture images of the items in the tote when at the robot.

Aspect 13 generally concerns the system of any previous aspect in which the robot camera is configured to capture image data of operations performed by the robot arm.

Aspect 14 generally concerns the system of any previous aspect including an operator camera.

Aspect 15 generally concerns the system of any previous aspect in which the operator camera is positioned proximal to the human operator.

Aspect 16 generally concerns the system of any previous aspect in which the operator camera is configured to capture image data of an operator performing operations on the tote.

Aspect 17 generally concerns the system of any previous aspect in which the camera includes the operator camera.

Aspect 18 generally concerns the system of any previous aspect in which the operator camera is configured to capture images of the items in the tote when at the operator station.

Aspect 19 generally concerns the system of any previous aspect including a computer.

Aspect 20 generally concerns the system of any previous aspect in which the computer is configured to learn tote rearrangement methods based on previously captured imaging.

Aspect 21 generally concerns the system of any previous aspect in which the computer is configured to distribute previously captured imaging to the robot via a network.

Aspect 22 generally concerns the system of any previous aspect in which the robot is configured to learn bin rearrangement techniques based on the previously captured imaging.

Aspect 23 generally concerns the system of any previous aspect in which the computer configured to determine if the tote is pickable by the robot based on the images from the camera.

Aspect 24 generally concerns the system of any previous aspect in which the computer is configured to route the tote to a human operator for rearrangement of the items in the tote when the tote is unpickable by the robot.

Aspect 25 generally concerns the system of any previous aspect in which the computer is configured to route the tote back to the robot after the human operator rearranges the items in the tote.

Aspect 26 generally concerns the system of any previous aspect in which the computer is configured to allow the robot to pick the bin when the tote is pickable.

Aspect 27 generally concerns the system of any previous aspect in which the computer is configured to rank totes based on probability of a successful pick.

Aspect 28 generally concerns the system of any previous aspect in which the computer is configured to route totes with a highest successful pick probability to the robot before lower ranked totes.

Aspect 29 generally concerns the system of any previous aspect in which the computer includes an algorithm configured to estimate success of robotic tote rearrangement.

Aspect 30 generally concerns the system of any previous aspect in which the computer is configured to route the tote to a robot when the tote is unpickable and the estimate of success is above a preset threshold.

Aspect 31 generally concerns the system of any previous aspect in which the computer is configured to route the tote to a station separate from the robot for rearrangement of the items in the tote when the tote is unpickable by the robot.

Aspect 32 generally concerns the system of any previous aspect in which the station includes an operator station where the human operator rearranges the items.

Aspect 33 generally concerns the system of any previous aspect in which the computer is configured to monitor tote rearrangement via the operator camera.

Aspect 34 generally concerns the system of any previous aspect in which the computer is configured to allow the robot arm to pick the items from the tote when the tote is pickable.

Aspect 35 generally concerns the system of any previous aspect in which the computer is configured to rank totes based on probability of successfully picking items from the totes.

Aspect 36 generally concerns the system of any previous aspect in which the computer is configured to route totes to the robot arm based on the rankings.

Aspect 37 generally concerns the system of any previous aspect in which the computer configured to determine a status of a tote.

Aspect 38 generally concerns the system of any previous aspect in which the computer is configured to monitor downtime and route tote to an idle human operator or robot.

Aspect 39 generally concerns the system of any previous aspect in which the computer is configured to monitor tote rearrangement time by the human operator and/or the robot.

Aspect 40 generally concerns the system of any previous aspect in which the computer includes an artificial intelligence (AI) system.

Aspect 41 generally concerns the system of any previous aspect in which the artificial intelligence (AI) system is configured to determine the status of the tote.

Aspect 42 generally concerns the system of any previous aspect in which the AI system is configured to determine if the tote is pickable by the robot based on the images from the camera.

Aspect 43 generally concerns the system of any previous aspect in which the AI system is configured to learn operations from captured image data.

Aspect 44 generally concerns the system of any previous aspect in which the AI system is configured to learn how to pick from and/or place into the tote the items based on the captured image data.

Aspect 45 generally concerns the system of any previous aspect in which the AI system is configured to estimate success of the robot arm rearranging items in the tote.

Aspect 46 generally concerns the system of any previous aspect in which the computer includes a controller.

Aspect 47 generally concerns the system of any previous aspect in which the controller is configured to control the robot.

Aspect 48 generally concerns the system of any previous aspect in which the controller is configured to control the conveyor.

Aspect 49 generally concerns the system of any previous aspect in which the controller is incorporated in the camera.

Aspect 50 generally concerns the system of any previous aspect in which the computer includes a warehouse management system (WMS).

Aspect 51 generally concerns the system of any previous aspect in which the computer is configured to monitor operator downtime and route totes to an idle operator.

Aspect 52 generally concerns the system of any previous aspect in which the computer is configured to route the tote to a reconfigure station when the items in the tote are consider not pickable and the estimate of success is below a preset threshold.

Aspect 53 generally concerns the system of any previous aspect in which the computer is configured to monitor tote rearrangement time by the operator.

Aspect 54 generally concerns the system of any previous aspect including a conveyor.

Aspect 55 generally concerns the system of any previous aspect in which the conveyor includes a robot station proximal to the robot.

Aspect 56 generally concerns the system of any previous aspect in which the conveyor includes a human operator station where the human operator rearranges the items in the tote.

Aspect 57 generally concerns the system of any previous aspect in which the conveyor is configured to move the tote from the robot station to the human operator station when the tote is unpickable by the robot.

Aspect 58 generally concerns the system of any previous aspect in which the conveyor is configured to move the tote from the human operator station to the human station after the human operator rearranges the tote.

Aspect 59 generally concerns the system of any previous aspect in which the operator camera is positioned to image the human operator station.

Aspect 60 generally concerns the system of any previous aspect in which the robot camera is positioned to image the robot station.

Aspect 61 generally concerns the system of any previous aspect including an input/output (I/O) device.

Aspect 62 generally concerns the system of any previous aspect in which the input/output (I/O) device includes an indicator of proper tote arrangement.

Aspect 63 generally concerns the system of any previous aspect in which the I/O device is configured to provide instructions for proper tote arrangement to the human operator.

Aspect 64 generally concerns the system of any previous aspect in which the I/O device is configured to provide instructions to the human operator on how to arrange the items in the bin.

Aspect 65 generally concerns the system of any previous aspect in which the I/O device is positioned proximal to the human operator.

Aspect 66 generally concerns the system of any previous aspect including a network.

Aspect 67 generally concerns the system of any previous aspect in which the network operatively connects the camera to the computer.

Aspect 68 generally concerns the system of any previous aspect in which the network includes a local area network (LAN).

Aspect 69 generally concerns the system of any previous aspect in which the network includes a wide area network (WAN).

Aspect 70 generally concerns the system of any previous aspect in which the computer is configured to distribute previously captured imaging to the robot via the network.

Aspect 71 generally concerns the system of any previous aspect in which the network includes a wireless network.

Aspect 72 generally concerns a method.

Aspect 73 generally concerns the system or method of any previous aspect including capturing an image of a tote with a camera.

Aspect 74 generally concerns the system or method of any previous aspect including determining the tote is unpickable by a robot based on the image with a computer.

Aspect 75 generally concerns the system or method of any previous aspect including routing the tote to a human operator in response to the determining the tote is unpickable.

Aspect 76 generally concerns the system or method of any previous aspect including routing the tote to the robot after the human operator rearranges the tote.

Aspect 77 generally concerns the system or method of any previous aspect including routing the tote to the robot after the human operator rearranges one or more items in the tote.

Aspect 78 generally concerns the system or method of any previous aspect in which the tote contains one or more items.

Aspect 79 generally concerns the system or method of any previous aspect including picking at least one of the items in the tote with the robot.

Aspect 80 generally concerns the system or method of any previous aspect including determining a chance of success of the robot rearranging items in the tote is above a threshold with the computer.

Aspect 81 generally concerns the system or method of any previous aspect including attempting to rearrange the items in the tote using the robot before the routing the tote to the human operator.

Aspect 82 generally concerns the system or method of any previous aspect including determining the tote ranks ahead other totes with the computer based on probability of picking success.

Aspect 83 generally concerns the system or method of any previous aspect including routing the tote to the robot in response to the determining the tote ranks ahead other totes.

Aspect 84 generally concerns the system or method of any previous aspect including monitoring activity of the robot and/or the human operator.

Aspect 85 generally concerns the system or method of any previous aspect including finding the human operator is idle with the computer.

Aspect 86 generally concerns the system or method of any previous aspect including routing the tote to the human operator who is idle.

Aspect 87 generally concerns the system or method of any previous aspect including finding the robot is idle with the computer.

Aspect 88 generally concerns the system or method of any previous aspect including routing the tote to the robot that is idle.

Aspect 89 generally concerns the system or method of any previous aspect including determining if the robot and/or human operators are idle and/or active.

Aspect 90 generally concerns the system or method of any previous aspect including routing totes to the robots and/or human operators that are idle and/or inactive.

Aspect 91 generally concerns the system or method of any previous aspect including capturing one or more images of an operator performing one or more operations on a tote with a camera.

Aspect 92 generally concerns the system or method of any previous aspect including distributing the images to one or more computers using a network.

Aspect 93 generally concerns the system or method of any previous aspect including training at least one artificial intelligence (AI) system on at least one of the computers to perform a manipulation of one or more items in a tote using the images.

Aspect 94 generally concerns the system or method of any previous aspect including performing the manipulation of the items in the tote based on the training.

Aspect 95 generally concerns the system or method of any previous aspect in which the manipulation of the items includes picking and/or placing the items in the tote with a robot.

Aspect 96 generally concerns the system or method of any previous aspect in which the manipulation of the items includes rearranging the items in the tote with an operator.

Aspect 97 generally concerns the system or method of any previous aspect in which the operator is a human.

Aspect 98 generally concerns the system or method of any previous aspect in which the operator is a robot.

Aspect 99 generally concerns the system or method of any previous aspect including determining if the manipulation of the items was successful with the computer.

Aspect 100 generally concerns the system or method of any previous aspect including labeling the images associated with the manipulation with the AI system.

Aspect 101 generally concerns the system or method of any previous aspect in which the camera is a color camera.

Aspect 102 generally concerns the system or method of any previous aspect in which the camera is a three-dimensional camera.

Aspect 103 generally concerns the system or method of any previous aspect in which the camera is an infrared camera.

Aspect 104 generally concerns the system or method of any previous aspect in which the second camera aimed towards the same items in the tote.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
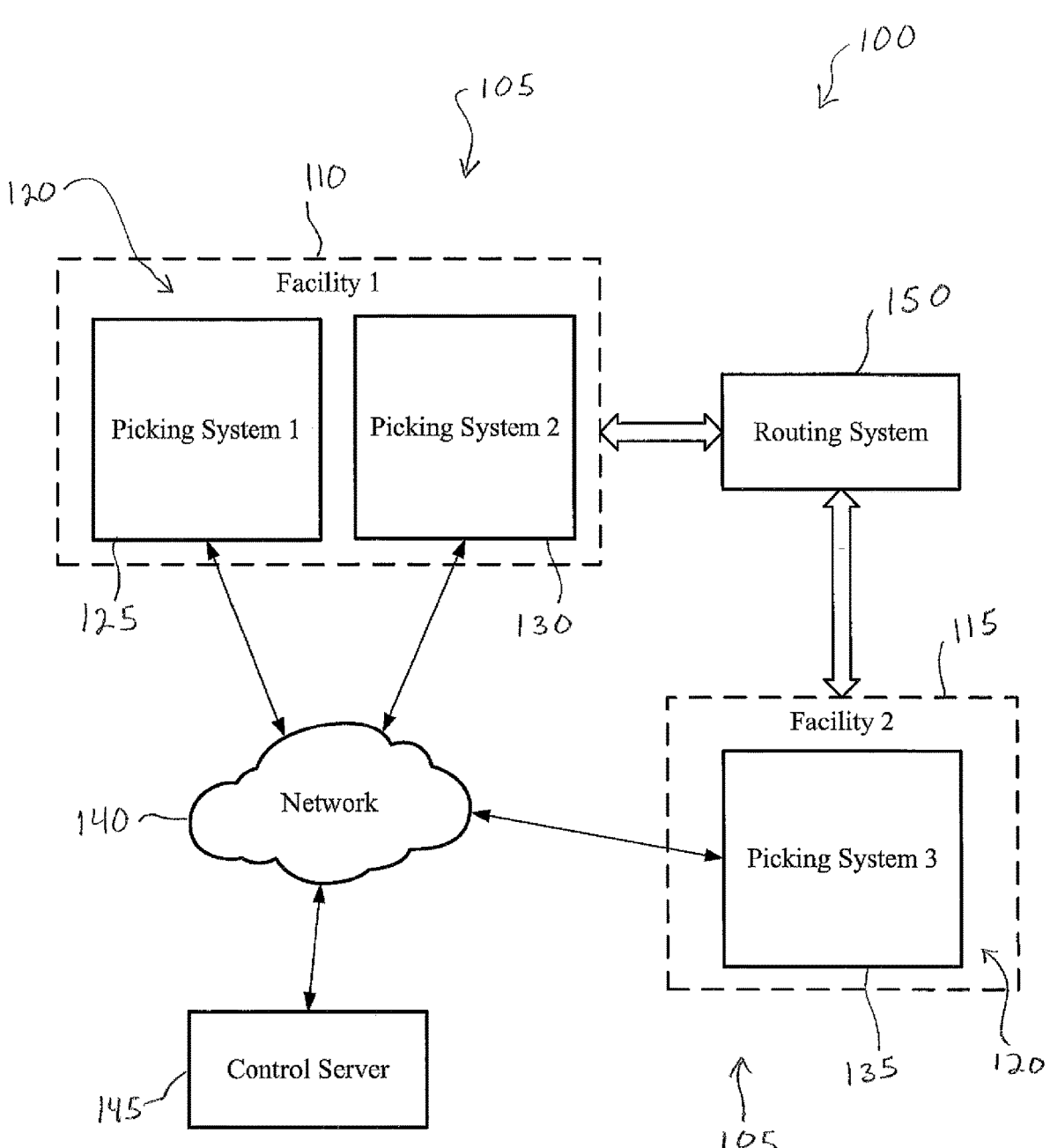
FIG. 1 is a block diagram of a multi-facility system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

FIG. 1 shows a block diagram of a multi-facility system 100 according to one example. The multi-facility system 100 generally includes one or more facilities 105, one or more picking systems 120, at least one wide area network (WAN) 140, one or more servers 145, and one or more routing systems 150. The facilities 105 are buildings or other structures that provide an environment to perform one or more specific tasks. For example, each facility 105, such as a warehouse or manufacturing plant, provides an environment for storage, packaging, manufacturing, fulfilling orders, and/or another purpose. Each facility 105 contains one or more picking systems 120. In the illustrated embodiment, a first facility 110 contains a first picking system 125 and a second picking system 130, and a second facility 115 contains a third picking system 135. The facilities 105 are configured to pick and/or place items in order to perform one or more tasks. For example, each facility 105 is configured to pick and/or place items for storage, packaging, manufacturing, fulfilling orders, and/or another purpose. In one embodiment, the picking systems 120 in a facility 105 perform all the tasks within the facility 105. In an alternate embodiment, the facility 105 includes one or more systems that perform additional tasks outside of the picking systems 120.

Each picking system 120 is operatively coupled to the wide area network 140. The wide area network 140 can include the Internet, a cellular network, and/or a private network. The wide area network 140 may connect to the facilities 105 using a wired or wireless connection. The picking systems 120 are configured to communicate with other devices on the wide area network 140. As examples, the picking systems 120 may send and/or receive requests, operational data, and/or other information with other devices on the wide area network 140. In one example, a picking system 120 may send and/or receive training data for picking and/or placing objects from one or more picking systems 120 on the wide area network 140. In another example, a picking system 120 may send and/or receive a command that affects operations in one or more other picking systems 120. Further, the facilities 105 are configured to communicate with one or more picking systems 120 such that the facilities 105 may indirectly send and/or receive information from other facilities 105 and/or picking systems 120 across the wide area network 140. For example, the first facility 110 may communicate with the first picking system 125 in order to send and/or receive data from the third picking system 135.

The wide area network 140 further connects to the server 145. The server 145 is configured to communicate with the picking systems 120 through the wide area network 140. For example, the server 145 may send, request, and/or receive data from the picking systems 120 on the wide area network 140. In another example, the server 145 may send commands and instructions to the picking systems 120 and/or communicate in another way with the picking systems 120. The server 145 includes one or more computers, controllers, and/or other computing devices. One or more computing devices on the server 145 are configured to determine data, commands, or other communications for the server 145 to send in response to communications from one or more picking systems 120 on the wide area network 140. For example, the server 145 may determine commands to send to a picking system 120 based on operational data received from one or more picking systems 120.

The routing system 150 interfaces with the facilities 105 in order to physically transport items from one facility 105 to another facility 105 and/or other destinations. The routing system 150 includes one or more vehicles, like trucks, and/or other transportation devices. The transportation devices are configured to transport individual items as well as multiple items packaged in one or more boxes, totes, crates, pallets, and/or other containers. The routing system 150 is further configured to communicate with the facilities 105. For example, a facility 105 is configured to send instructions to the routing system 150 for transporting certain items to one or more other facilities 105. The routing system 150 includes one or more computers, controllers, and/or other computing devices. The computing devices are configured to control movement of vehicles and/or determine a path for vehicles to travel between facilities 105 or elsewhere.

Figure 2:
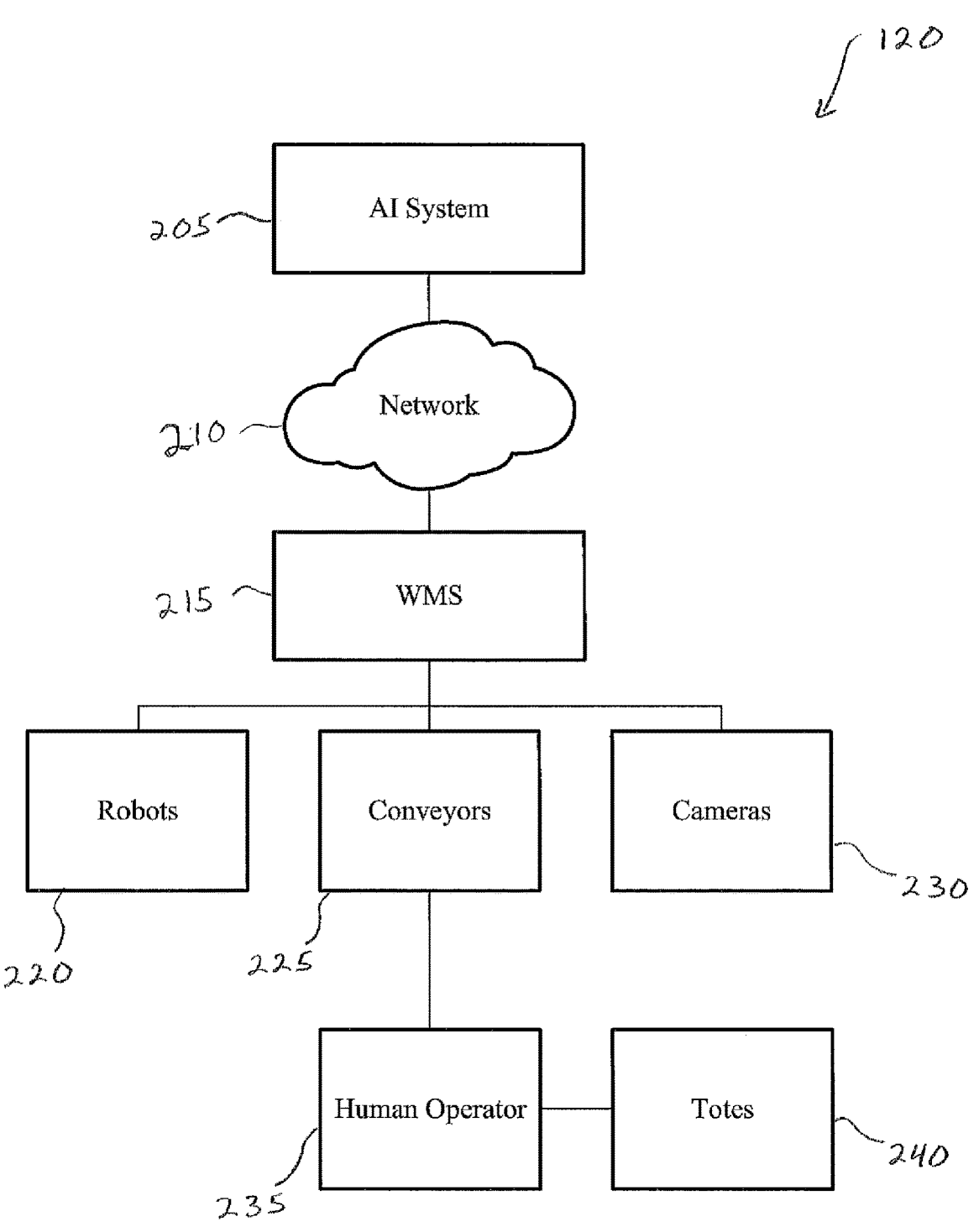
FIG. 2 is a block diagram of one example of a picking system used in the multi-facility system of FIG. 1.

FIG. 2 depicts a diagram of one embodiment of a picking system 120. The picking system 120 generally includes an artificial intelligence system (AI system) 205, a local area network (LAN) 210, and a warehouse management system (WMS) 215. Further, the picking system 120 includes one or more robots 220, conveyors 225, cameras 230, human operators 235, and totes 240.

The AI system 205 includes one or more computers, controllers, and/or other computing devices. The AI system 205 is configured to store data and/or algorithms for performing various tasks in the picking system 120. In one embodiment, the AI system 205 is fully trained for performing certain tasks in the picking system 120 or facility 105. For example, the AI system 205 can be trained for picking items, placing items, and/or routing items throughout a facility 105. In another embodiment, the AI system 205 is configured to train, test, and/or validate artificial intelligence models related to such tasks using data recorded from one or more picking systems 120. The AI system 205 in one form utilizes a variety of machine learning techniques. For example, the AI system 205 is configured to develop algorithms or models using supervised learning, unsupervised learning, semi-supervised learning, and/or other machine learning techniques.

The AI system 205 typically includes one or more neural networks. For example, the AI system 205 may include one or more convolutional neural networks, recurrent neural networks, generative neural networks, discriminative neural networks, and/or other types of neural networks. In one embodiment, the AI system 205 includes generative adversarial networks to train on the dataset. In another embodiment, convolutional neural networks are used to train on the data. In another embodiment, a transformer-based architecture is used to train on the data. In yet another embodiment, reinforcement learning paradigms can be used to train on the data. Multiple instances of the above discussed or other types of AI architectures may be used during training and inference stage.

The local area network 210 connects to the AI system 205 and the WMS 215. The local area network 210 may be a wired or wireless network. The AI system 205 and WMS 215 are configured to communicate over the local area network 210. For example, the WMS 215 may send data about the operation of one or more components of the picking system 120 to the AI system 205. In another example, the AI system 205 may send instructions and/or algorithms for one or more components to the picking system 120 to the local area network 210. In one embodiment, the local area network 210 is connected to the wide area network 140. The AI system 205 and/or WMS 215 of one picking system 120 is configured to communicate with another picking system 120 through the wide area network 140 in this way. For example, the AI system 205 and/or WMS 215 of one picking system 120 may send recorded data, AI algorithms, and/or other information to another AI system 205.

The WMS 215 is configured to manage the operations of the components of one or more robots 220, conveyors 225, and/or cameras 230. In one embodiment, the WMS 215 is connected directly to the robots 220, conveyors 225, and cameras 230. In an alternative embodiment, the WMS 215 is connected to one or more controllers or other computing devices that connect to the robots 220, conveyors 225, and cameras 230 such as through the local area network 210. The WMS 215 in one version is connected to such devices through one or more wired and/or wireless connections. In one embodiment, the WMS 215 connects to the robots 220, conveyors 225, and cameras 230 through one or more wireless networks. The WMS 215 is configured to send, request, and/or receive data from one or more devices. For example, the WMS 215 may collect data from one or more robots 220, conveyors 225, and/or cameras 230 and send the data to the AI system 205. Further, the WMS 215 is configured to send instructions and/or algorithms for performing a task to one or more robots 220 and/or conveyors 225.

The WMS 215 includes one or more computers, controllers, and/or other computing devices. The WMS 215 is configured to determine data, commands, or other communications to send in response to communication from one or more devices within the picking system 120. In one embodiment, the WMS 215 is fully automated. In another embodiment, the WMS 215 accepts inputs from a human to change one or more aspects of operations in the picking system 120. For example, a human may fully or partially control one or more robots 220, conveyors 225, and/or cameras 230 through the WMS 215. Each robot 220 includes a robot arm or another type of machine that includes an end effector or end of arm tool (EoAT). The robots 220 are configured to pick items out from and/or place items into bins. The end effector of each robot 220 may be configured to pick one or more specific types of items. Similarly, the range and degrees of freedom of each robot 220 may vary depending on the type of items or bins the robot 220 picks. In one embodiment, the robots 220 are robot arms with at least six degrees of freedom and claw-like end effectors that are capable of gripping multiple types of objects.

In one embodiment, the robots 220 include one or more computing devices to store and/or process data, instructions, algorithms, and/or other information. For example, the robots 220 may store training data and machine learning algorithms and may create or refine additional algorithms or models used to perform a task. In another embodiment, the robots 220 receive instructions from an external computing device. In yet another embodiment, data about the operation of the robots 220 is stored in an external computing device.

The conveyors 225 are configured to transport items throughout the picking system 120. For example, the conveyors 225 may transport items to a robot 220 or a human operator 235 for picking. In one embodiment, a human operator 235 manually adds items or totes 240 filled with items to the conveyors 225. For example, a human operator 235 may place items and/or totes 240 onto the conveyors 225 from storage within the facility 105 or from an outside delivery by the routing system 150. In an alternate embodiment, the conveyors 225 receive items and/or totes 240 through one or more automated devices. In one embodiment, the conveyors 225 include one or more computing devices, such as conveyor controllers, to store and/or process data, instructions, algorithms, and/or other information. For example, the conveyors 225 may store data about the status of one or more robots 220 and may determine routing for one or more items based on the status data. In another embodiment, the conveyors 225 receive instructions from an external computing device.

Each camera 230 is configured to monitor one or more robots 220, conveyors 225, human operators 235, and/or totes 240. The picking systems 120 may include different types of cameras 230. For example, one or more cameras 230 may record three-dimensional images and one or more cameras 230 may record two-dimensional images. As another example, multiple cameras 230 may record images of the same object. In one embodiment, one or more cameras 230 are configured to capture video and audio. In one embodiment, the cameras 230 include one or more computing devices to store and/or process image and/or video data. In an alternative embodiment, the cameras 230 transmit raw image and/or video signals directly to the WMS 215 or an external controller.

The cameras 230 and/or computing devices within the picking system 120 function as a vision system and are configured to perform computer vision tasks. For example, one or more computing devices may process image data recorded by a camera 230 in order to identify an object, track motion of an object, determine a three-dimensional position of an object, and/or determine other information. In one embodiment, a computing device on the camera 230 is configured to perform computer vision tasks. In an alternate embodiment, the WMS 215, the AI system 205, and/or an external computing device is configured to perform computer vision tasks using data from the camera 230. Further, one or more devices in the picking system 120 utilize machine learning to determine algorithms and/or models for performing computer vision tasks. For example, one or more devices may utilize a neural network that has been trained to identify a specific object for a robot 220 to pick.

The human operators 235 perform various tasks related to the totes 240 that assist the robots 220. For example, the human operators 235 may load totes 240 onto the conveyors 225, load objects into a tote 240, rearrange objects within a tote 240 to be pickable for a robot 220, and/or perform other tasks. In one embodiment, the human operators 235 are not permitted to pick objects from a tote 240. The totes 240 are configured to support or contain a variety of objects. Different types of totes 240 may be utilized for different types of objects. For example, a different size or shape of tote 240 may be used in order to place or organize different types of objects within the tote 240. Similarly, different types of totes 240 may be used for picking objects rather than placing objects. In one embodiment, objects are not picked and/or placed from discrete totes 240. For example, the totes 240 may refer to a portion of the conveyor 225, and the robot 220 may pick and/or place objects directly onto the conveyor 225.

Figure 3:
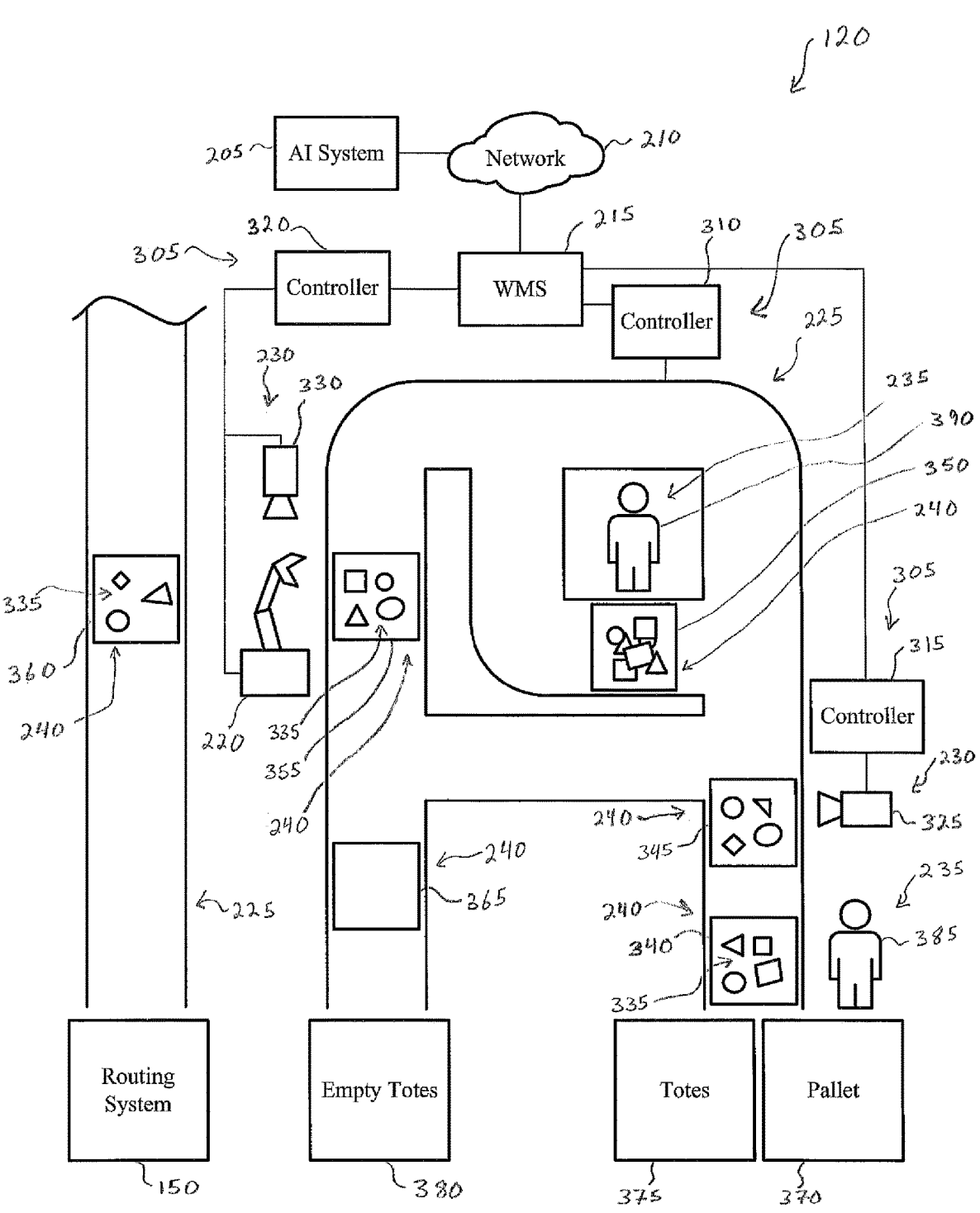
FIG. 3 is a diagram the FIG. 2 picking system.

FIG. 3 shows a diagrammatic view of one implementation example of the picking system 120. As shown, the picking system 120 generally includes the AI system 205, local area network 210, and WMS 215. The picking system 120 further includes one or more robots 220, conveyors 225, cameras 230, totes 240, controllers 305, and items 335. The controllers 305 collectively include one or more conveyor controllers 310, camera controllers 315, and/or robot controllers 320. Similarly, the cameras 230 collectively include one or more operator cameras 325 and/or robot cameras 330. The totes 240 collectively include one or more loading totes 340, status monitoring totes 345, rearranging totes 350, picking totes 355, placing totes 360, and/or empty totes 365. Additionally, the picking system 120 is configured to interface with one or more pallets 370, a tote storage 375, a tote return 380, and the routing system 150.

The controllers 305 are connected to the WMS 215 and to one or more robots 220, conveyors 225, and/or cameras 230. The controllers 305 are configured to communicate with the WMS 215 and the robots 220, conveyors 225, and/or cameras 230 using wired and/or wireless connections. For example, the controllers 305 may send and/or receive data, commands, and/or other information between connected devices. Each controller 305 includes one or more computing devices. The computing devices of each controller 305 are configured to store and/or process data, commands, algorithms, and/or other information.

In the illustrated embodiment, the conveyor controller 310 is connected to the conveyor 225 and the WMS 215. In one embodiment, the conveyor controller 310 is configured to send a command to the conveyor 225 in response to data or commands sent by the WMS 215. For example, the conveyor controller 310 may send a command to the conveyor 225 to route the tote 240 to the human operator 235 in response to receiving information about a status of that tote 240. In another embodiment, the conveyor controller 310 is configured to receive data from the conveyor 225 and to send data to the WMS 215. For example, the conveyor controller 310 may receive data about the activity of different sections of the conveyor 225 and send that data to the WMS 215.

In the illustrated embodiment, the camera controller 315 is connected to the operator camera 325 and the WMS 215. In one embodiment, the camera controller 315 is configured to receive data from the operator camera 325 and to process that data. For example, the camera controller 315 may receive imaging data from the camera controller 315 and may determine whether the tote 240 is pickable. In another embodiment, the camera controller 315 is configured to determine a status of the tote 240 and send status information to the WMS 215. For example, the camera controller 315 may determine that the tote 240 is pickable and send information about the pickable status to the WMS 215.

In the illustrated embodiment, the robot controller 320 is connected to the robot camera 330, the robot 220, and the WMS 215. In one embodiment, the robot controller 320 is configured to receive data from the robot camera 330, process the data, and send a command to the robot 220. For example, the robot camera 330 receives image data about the tote 240, determines the location of the item 335 to pick within the tote 240, and sends commands to the robot 220 for picking that item 335. In another embodiment, the robot controller 320 sends data from the robot camera 330 to and receives a command for the robot 220 from the WMS 215.

For example, the robot controller 320 sends image data from the robot camera 330 to the WMS 215 and receives a command from the WMS 215 for the robot 220 to rearrange items 335 in the tote 240.

The items 335 and totes 240 enter the picking system 120 through one or more pallets 370 and/or the tote storage 375. The pallets 370 contain the items 335. In one embodiment, the routing system 150 transports one or more pallets 370 to the picking system 120. In another embodiment, the pallets 370 arrive at the picking system 120 from one or more other picking systems 120, facilities 105, and/or another source. The pallets 370 may include one or more totes 240. For example, the pallet 370 may contain one or more totes 240 that each contain items 335. Alternatively, the pallet 370 may only contain the items 335. Conversely, the tote storage 375 contains totes 240. In one embodiment, the tote storage 375 is contained within the same facility 105 as the picking system 120. The tote storage 375 may include items 335 within the totes 240. Alternatively, the totes 240 in the tote storage 375 may not contain any items 335.

The items 335 are distributed among various totes 240 throughout the picking system 120. In one embodiment, the human operator 235 places the items 335 from the pallet 370 into one or more totes 240. In an alternate embodiment, the items 335 are already placed in the totes 240 within the pallet 370 or tote storage 375. The items 335 may be distributed into different totes 240 based on item material, type, size, and/or other characteristics. Alternatively, the items 335 may be distributed randomly into various totes 240. Similarly, items 335 within a tote 240 may be arranged in an orderly or a disorderly fashion. For example, the human operator 235 may stack items 335 in a stable and orderly configuration within the tote 240. In another example, the items 335 within the tote 240 may be placed randomly throughout the tote 240.

The picking system 120 is configured to determine one or more statuses for the tote 240 and/or the item 335 in the tote 240. The statuses may include pickable, unpickable, a probability of being pickable, and/or another status. For example, the tote 240 is considered pickable when items 335 are neatly organized within the tote 240, and the tote 240 is considered unpickable otherwise. The AI system 205, WMS 215, controllers 305, and/or another computing device are configured to determine the statuses. In one embodiment, one or more computing devices use AI to determine a status of the tote 240. For example, an AI model may predict a path of movement for a robot 220 to successfully pick the item 335 from the tote 240 and may determine that the tote 240 is pickable. The AI model may consider the size, shape, positioning, and/or other characteristics of the tote 240 and/or items 335 to determine a status.

In the illustrated embodiment, a loading human operator 385 manually loads totes 240 onto the conveyor 225. In one embodiment, the loading human operator 385 loads a loading tote 340 from the pallet 370 onto the conveyor 225 and loads items 335 from the tote storage 375 into the loading tote 340. In another embodiment, the loading tote 340 is already filled with items 335 and the loading human operator 385 loads the loading tote 340 onto the conveyor 225 from one of the pallet 370 and tote storage 375. As shown, the operator camera 325 and/or another camera 230 is configured to record the loading human operator 385 loading the loading tote 340 onto the conveyor 225 and/or loading items into the loading tote 340. Image and/or video data recorded by the operator camera 325 may be used for training the AI system 205 and/or robots 220. Specifically, the data may be used to train the AI model to successfully pick and/or place items 335 using the robot 220.

The operator camera 325 and/or another camera 230 are further configured to monitor a status monitoring tote 345. The status monitoring tote 345 may be the loading tote 340 that is routed further along the conveyor 225 or may be a distinct tote 240. In one embodiment, the operator camera 325 is configured to capture images and/or videos of the status monitoring tote 345 that are used to determine a status of the status monitoring tote 345. In another embodiment, the camera controller 315 or another computing device is configured to determine a status of the loading tote 340 and status monitoring tote 345 and the picking system 120 is configured to prompt the loading human operator 385 to adjust items 335 within the loading tote 340 and/or status monitoring tote 345 depending on the status.

The operator camera 325 and/or another camera 230 are further configured to monitor a rearranging tote 350. The rearranging tote 350 may be the status monitoring tote 345 that is routed further along the conveyor 225 or may be a distinct tote 240. In the illustrated embodiment, the rearranging tote 350 includes items 335 that are overlapping or are disorganized in a way that causes the rearranging tote 350 to be unpickable. In one embodiment, when the AI system 205, camera controller 315, or another computing device determines that the rearranging tote 350 is unpickable, the conveyor 225 is configured to route the rearranging tote 350 to a rearranging human operator 390 or another human operator 235. The rearranging human operator 390 rearranges one or more items 335 in the rearranging tote 350. In one embodiment, one or more computing devices are configured to store image and/or video data of the rearranging human operator 390 rearranging the rearranging tote 350. For example, the computing devices may store the data as training data for developing AI models. Specifically, the data may be used to train the AI models to successfully rearrange the rearranging tote 350 using the robot 220.

The picking system 120 in one form includes an indicator to notify the human operator 235 when the items 335 in the tote 240 are properly organized. The indicator is configured to provide visual, auditory, and/or another form of indication to the human operator 235. For example, the picking system 120 may include a green light that illuminates when the human operator 235 has successfully rearranged items 335 in the tote 240. Further, the indicator may be inactive when items 335 are not arranged properly in the tote 240. In one embodiment, the indicator is configured to activate after the rearranging human operator 390 rearranges items 335 in the rearranging tote 350. In an alternate embodiment, the indicator is configured to activate after the loading human operator 385 properly loads items 335 into the loading tote 340 and/or status monitoring tote 345.

In the illustrated embodiment, a robot camera 330 and/or another camera 230 is configured to monitor a picking tote 355 and a robot 220. The picking tote 355 may be the status monitoring tote 345 or rearranging tote 350 routed further along the conveyor 225 or may be a distinct tote 240. In one embodiment, the conveyor 225 is configured to route the picking tote 355 to the robot 220 when a computing device has determined the picking tote 355 to be pickable. When the picking tote 355 is pickable, the robot 220 is configured to pick one or more items 335 from the picking tote 355. The robot 220 may utilize feedback based on image and/or video data recorded by the robot camera 330 or another camera 230. For example, the robot controller 320, AI system 205, or another computing device may send picking commands to the robot 220 in response to data from the robot camera 330.

While picking, one or more computing devices may instruct the robot 220 to move one or more other items 335 in order to pick a target item 335. In one embodiment, the robot 220 is configured to imitate the picking movements of a human operator 235. For example, an AI model may be trained on data of a human operator 235 picking a tote 240 and may be implemented on a computing device attached to the robot 220.

Alternatively or additionally, the conveyor 225 may route the picking tote 355 to the robot 220 regardless of the status of the picking tote 355. The robot controller 320, AI system 205, or another computing device may determine the status of the picking tote 355 based on data from the robot camera 330 or another camera 230. In one embodiment, the robot 220 is configured to attempt to pick items 335 from the picking tote 355 without a known status. In an alternate embodiment, the robot 220 is configured to pick items 335 from the picking tote 355 after a computing device determines that the picking tote 355 is pickable. The robot 220 may attempt to rearrange items 335 in the picking tote 355 if the picking tote 355 is unpickable. For example, the robot 220 may push, grab, stir, or directly move items 335 in the picking tote 355. In another example, the robot 220 may rotate, shake, tilt, or move the picking tote 355 in another way in order to indirectly change the position of items 335 in the tote 240. In one embodiment, the robot 220 is configured to imitate the rearrangement movements of a human operator 235. For example, an AI model may be trained on data of the human operator 235 rearranging the tote 240 and may be implemented on a computing device on the robot 220.

After picking one or more items 335 from the picking tote 355, the robot 220 is configured to place the items 335 into the placing tote 360. The robot 220 may utilize feedback based on image and/or video data recorded by the robot camera 330 or another camera 230. For example, the robot controller 320, AI system 205, or another computing device may send placing commands to the robot 220 in response to data from the robot camera 330. While placing, one or more computing devices may instruct the robot 220 to move one or more other items 335 in order to place a target item 335. In one embodiment, the robot 220 is configured to imitate the placing movements of a human operator 235. For example, an AI model may be trained on data of a human operator 235 placing items 335 in a tote 240 and may be implemented on a computing device on the robot 220.

In the illustrated embodiment, the conveyor 225 is configured to route the placing tote 360 to the routing system 150 after the robot 220 places items 335 into the placing tote 360. The conveyor 225 may route the placing tote 360 after the robot 220 places the required items 335 in the placing tote 360 and the status is considered processed. For example, the placing tote 360 is considered processed if the placing tote 360 contains the required items 335 to fulfil an order, organize an inventory, manufacture a product, and/or perform another task. The robot camera 330 or another camera 230 is configured to capture image and/or video data of the placing tote 360. In one embodiment, one or more computing devices are configured to determine when the placing tote 360 is ready to be routed based on data from the robot camera 330 or another camera 230. For example, an AI model on a computing device may determine that the correct items 335 are placed in the placing tote 360. The routing system 150 may send the placing tote 360 and/or other totes 240 to another picking system 120 or destination. Alternatively, the conveyor 225 may route the placing tote 360 to another part of the facility 105.

The warehouse management system 215 is further configured to route the empty tote 365 to the tote return 380 after items 335 have been picked. The empty tote 365 may be the picking tote 355 routed further along the conveyor 225 or may be a distinct tote 240. In the illustrated embodiment, the empty tote 365 is empty and has had all items 335 picked. In an alternate embodiment, the empty tote 365 still contains one or more items 335 but less items 335 than originally contained. The tote return 380 is configured to store totes 240 and optionally items 335. For example, the tote return 380 may be a storage and/or inventory center or buffer within the picking system 120. In one embodiment, the tote return 380 is configured to return totes 240 to the tote storage 375. For example, the tote return 380 sends the empty tote 365 and other empty totes 240 to the tote storage 375 in order for a human operator 235 to pack new picking totes 355 into the totes 240.

In the illustrated embodiment, the picking system 120 includes one loop of the conveyors 225 for transporting the totes 240 to the possible locations for picking, placing, and rearranging. In an alternate embodiment, the picking system 120 includes multiple loops of the conveyors 225 such that the conveyors 225 are configured to route the totes 240 to multiple robots 220 and/or human operators 235 at one or more picking, placing, and/or rearranging locations. For example, the picking system 120 includes multiple parallel branches of the conveyors 225 to route totes 240 such that multiple loading human operators 385 perform actions on multiple loading totes 340 and/or status monitoring totes 345, multiple rearranging human operators 390 perform actions on multiple rearranging totes 350, and/or multiple robots 220 perform actions on multiple picking totes 355 and/or placing totes 360.

Figure 4:
FIG. 4 is a diagram of a computing device used in the FIG. 1 multi-facility system.
Figure 4:
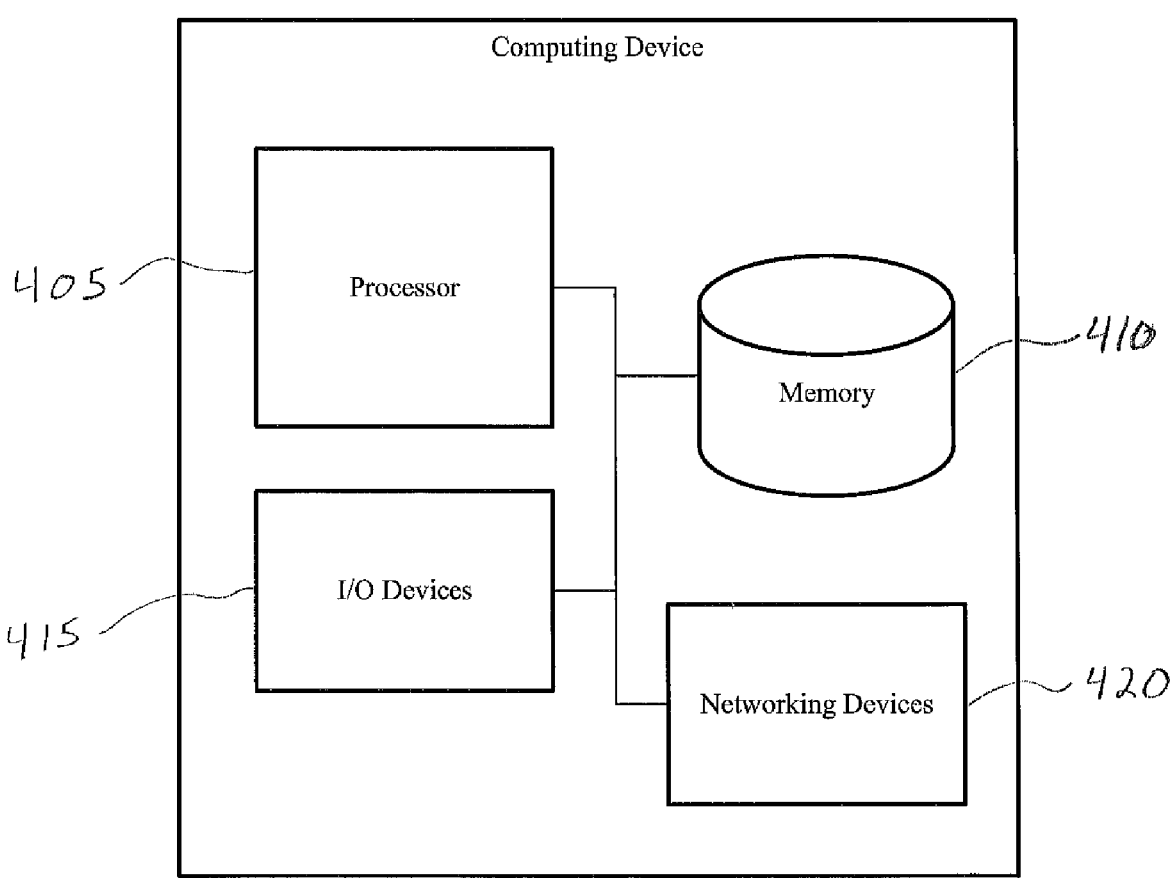

FIG. 4 illustrates one embodiment of a computer or computing device 400 that can be used in the picking system 120 of FIGS. 2 and 3. For example, the depicted computing device 400 can be incorporated into the robots 220, conveyors 225, and cameras 230 of the picking system 120 in FIG. 3. In one form, the conveyor controller 310, camera controller 315, and robot controller 320 include the computing device 400. The computing device 400 generally includes at least one processor 405, memory 410, input/output device (I/O device) 415, and network interface 420. The processor 405, memory 410, I/O device 415, and network interface 420 are all connected and configured to communicate with one another. One or more parts of the multi-facility system 100 include a computing device 400. For example, the wide area network 140, AI system 205, local area network 210, WMS 215, robots 220, conveyors 225, cameras 230, controllers 305, and/or another part of the multi-facility system 100 may include one or more computing devices 400.

The processor 405 is configured to perform calculations and/or other computational tasks. For example, the processor 405 may train, test, and/or validate an AI model. In another example, the processor 405 may perform an algorithm that involves one or more AI models. The memory 410 is configured to store data, algorithms, and/or other information. For example, the memory 410 may store data used for training, testing, and/or validating AI models. In another example, the memory 410 may store machine learning algorithms and/or AI models that have been developed through machine learning.

The I/O device 415 is configured to provide an interface between the computing device 400 and various external devices. For example, the I/O device 415 may connect a computing device 400 to one or more robots 220, conveyors 225, cameras 230, controllers 305, and/or other devices. The I/O device 415 is configured to support communication between the computing device 400 and such devices. For example, the computing device 400 may directly send and/or receive data, commands, and/or other information using the I/O device 415. Similarly, the network interface 420 is configured to provide an interface between the computing device 400 and various networks. For example, the network interface 420 may connect the computing device 400 to the wide area network 140 and/or local area network 210. The network interface 420 is configured to support communication between the computing device 400 and such networks. For example, the computing device 400 may send and/or receive data, commands, and/or other information across one or more networks using the network interface 420. The network interface 420 may support wired and/or wireless connections.

Figure 5:
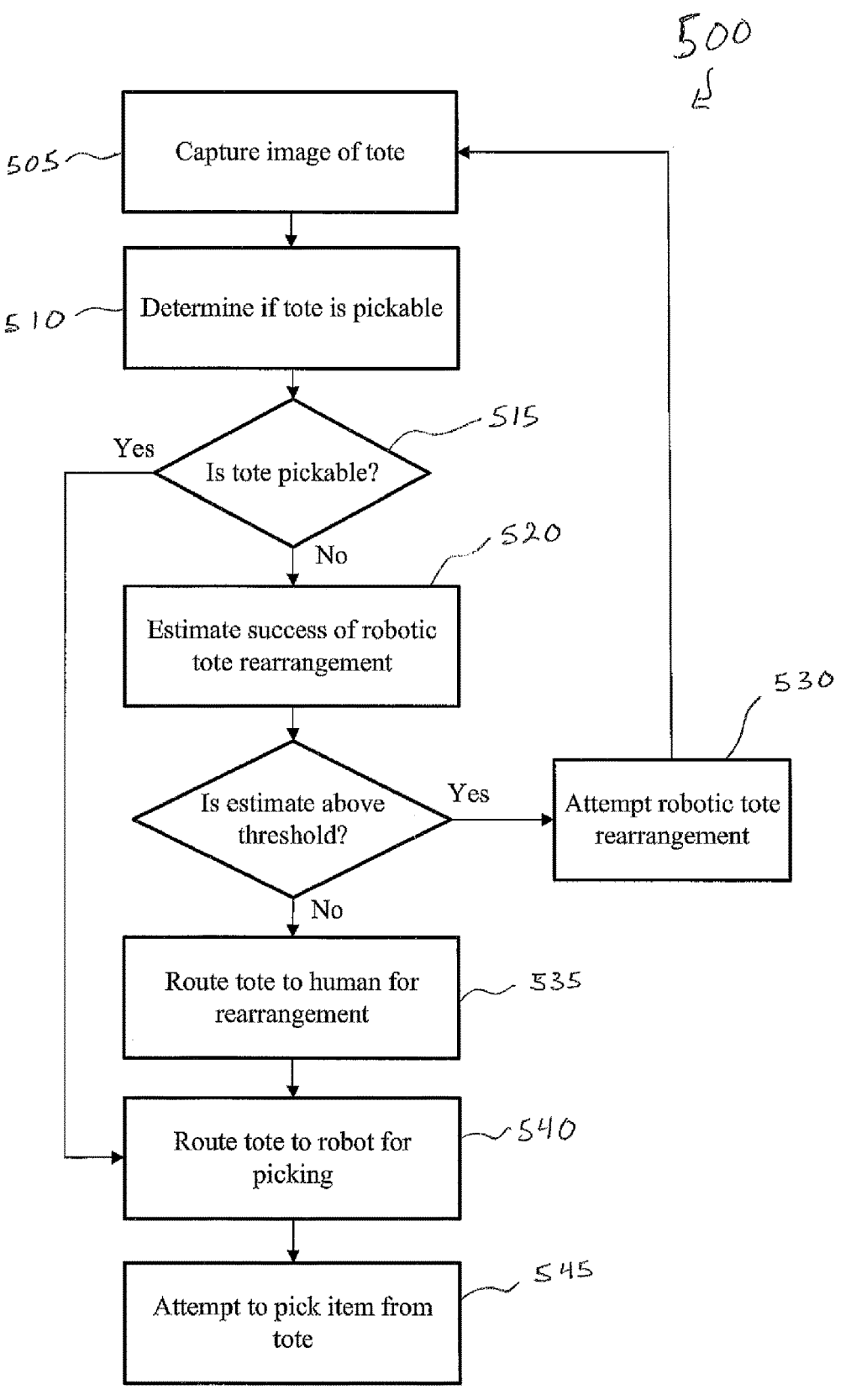
FIG. 5 is a flowchart of a technique for routing totes in the FIG. 2 picking system.

FIG. 5 depicts a flowchart 500 illustrating a technique for routing totes 240 throughout the picking system 120 in FIGS. 2 and 3. At stage 505, one or more cameras 230 in the picking system 120 are configured to capture an image of the tote 240. The cameras 230 are configured to record image and/or video data. At stage 510, one or more computing devices 400 of the picking system 120 determine if the tote 240 is pickable. The computing devices 400 are configured to utilize AI models to determine if the tote 240 is pickable. At stage 515, if the computing devices 400 determine that the tote 240 is unpickable, the picking system 120 continues to stage 520.

At stage 520, the computing devices 400 of the picking system 120 estimate the success of the robot 220 rearranging the items 335 in the tote 240 in order to make the tote 240 pickable. Similar to stage 510, stage 520 is configured to utilize AI models to estimate picking success. At stage 525, the computing devices 400 compare the picking success estimate to a threshold value. If the estimate is above the threshold, the computing device 400 of the picking system 120 continues to stage 530. At stage 530, the robot 220 attempts to rearrange the items 335 in the tote 240. The computing devices 400 are configured to utilize one or more AI models to determine movement of the robot 220 for rearrangement. The picking system 120 then continues back to the stage 505 in order to reevaluate the status of the tote 240 after a rearrangement attempt. In this way, it is possible for the robot 220 to properly rearrange the tote 240 without a human operator 235 and reduce potential downtime.

Conversely, if the estimate is below the threshold at stage 525, the picking system 120 continues to stage 535. In one embodiment, stage 520, stage 525, and stage 530 are optional, and the computing devices 400 of the picking system 120 proceeds directly from stage 515 to stage 535. At stage 535, the conveyor 225 routes the tote 240 to the human operator 235 in order for the human operator 235 to manually rearrange items 335 within the tote 240. By routing totes 240 to human operators 235 in a different part of the picking system 120, it is safe for the robots 220 to continue operating and system downtime is reduced. Once the human operator 235 has properly rearranged the tote 240, the computing device 400 in the picking system 120 continues to stage 540. Additionally, at the stage 515, the picking system 120 continues to stage 540 if the computing devices 400 determine that the tote 240 is pickable. At stage 540, the conveyor 225 routes the tote 240 to the robot 220 for picking. From stage 540, the picking system 120 then proceeds to stage 545. At stage 545, the robot 220 attempts to pick one or more items 335 from the tote 240.

Figure 6:
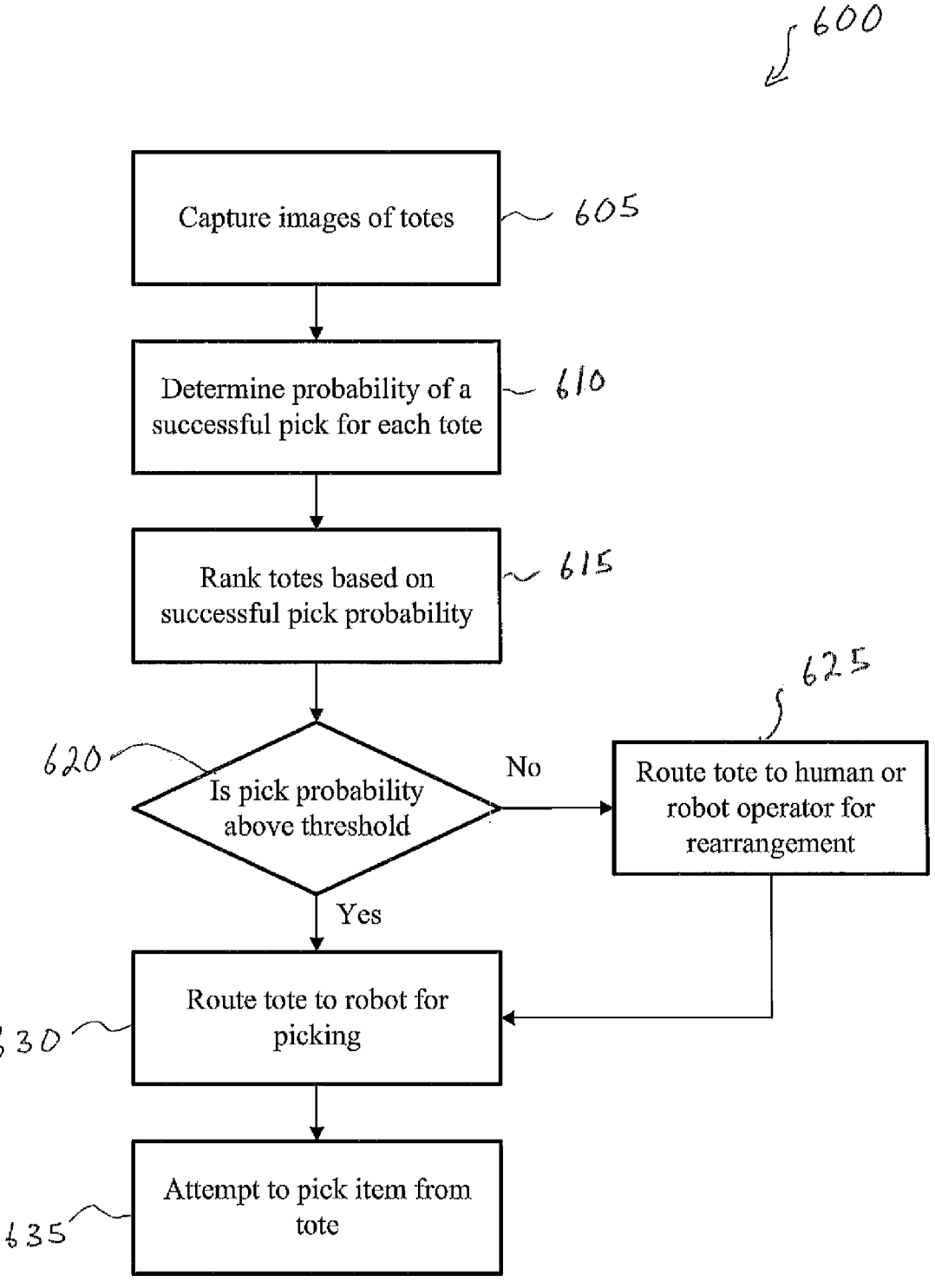
FIG. 6 is a flowchart of another technique for routing totes in the FIG. 2 picking system.

FIG. 6 depicts a flowchart 600 for a method of routing totes 240 throughout the picking system 120. At stage 605, one or more cameras 230 in the picking system 120 are configured to capture an image of one or more totes 240. The cameras 230 are configured to record image and/or video data. At stage 610, one or more computing devices 400 of the picking system 120 determine a probability of the robot 220 performing a successful pick operation for each of the totes 240. At stage 615, one or more computing devices 400 of the picking system 120 rank the totes 240 based on the pick probabilities determined in stage 610. From stage 615, the picking system 120 proceeds to stage 620. In an alternate embodiment, the picking system 120 proceeds directly from stage 610 to stage 620.

At stage 620, the pick probabilities for each tote 240 are compared with a threshold value. If the probability is below the threshold for the tote 240, the picking system 120 proceeds to stage 625. At stage 625, the conveyor 225 routes the tote 240 to the human operator 235 for rearranging items 335 in the tote 240. When the human operator 235 properly rearranges the tote 240 in stage 625, the computing device 400 of the picking system 120 proceeds to stage 630. Alternatively, if the probability is above the threshold for the tote 240 at stage 620, the picking system 120 proceeds to stage 630. At stage 630, the conveyor 225 routes the totes 240 to the robot 220 for picking. By routing totes 240 based on high pick probabilities, the robots 220 are less likely to require the assistance of the human operator 235 and potential downtime is reduced. The picking system 120 proceeds to stage 635, where the robot 220 attempts to pick each of the totes 240.

Figure 7:
FIG. 7 is a flowchart of a further technique for routing totes in the FIG. 2 picking system.
Figure 7:
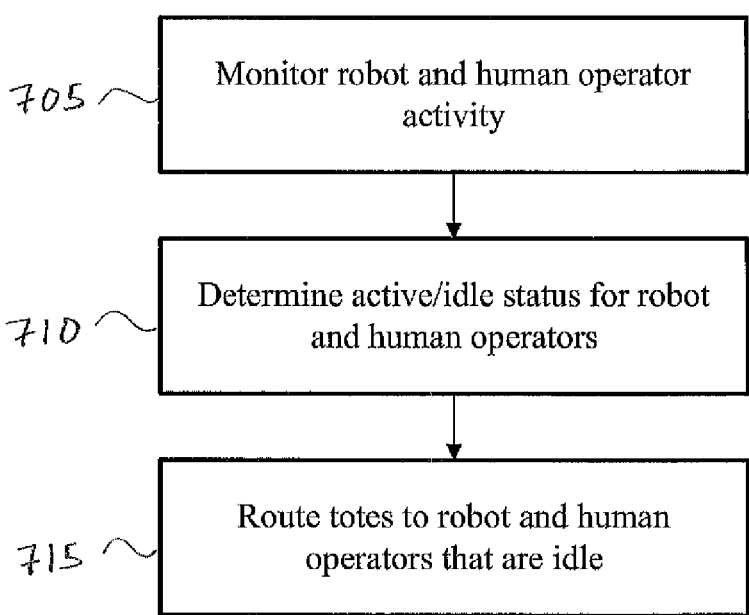

FIG. 7 has a flowchart 700 illustrating a method of routing totes 240 throughout the picking system 120. At stage 705, one or more devices monitor the activity of the robots 220 and human operators 235. In one embodiment, the cameras 230 monitor the activity. In another embodiment, information from the robots 220 and/or human operators 235 is used to monitor the activity. At stage 710, one or more computing devices 400 of the picking system 120 determine the status for the robots 220 and/or human operators 235. The status is either active or idle. At stage 715, the conveyor 225 routes totes 240 to robots 220 and/or human operators 235 that have idle status. In this way, the downtime of the picking system 120 is reduced by minimizing the downtime of individual robots 220 and/or human operators 235.

Figure 8:
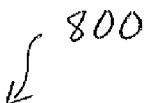
FIG. 8 is a flowchart of a technique for training robots in the FIG. 2 picking system.
Figure 8:
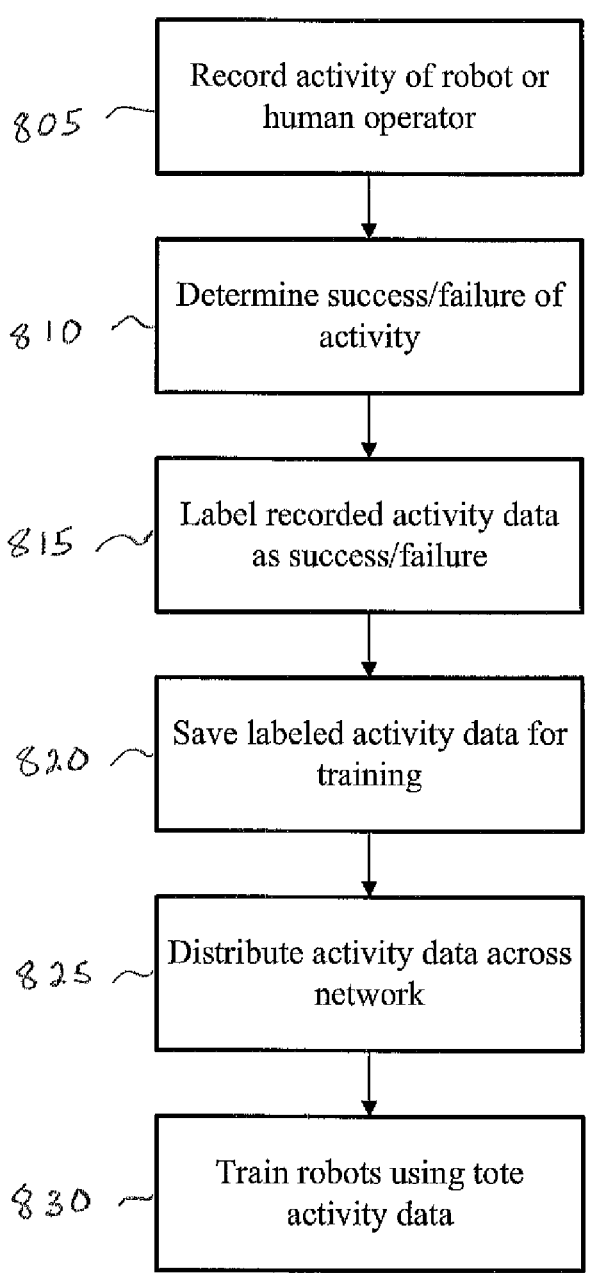

FIG. 8 includes a flowchart 800 illustrating a method for training the robots 220 of the picking system 120. At stage 805, one or more cameras 230 record the robot 220 and/or human operator 235 performing one or more actions on the tote 240. For example, the camera 230 records the robot 220 and/or human operator 235 rearranging, picking, placing, and/or performing other actions to items 335 in the tote 240. In one embodiment, the camera 230 records video while the robot 220 and/or human operator 235 performs actions. In another embodiment, the camera 230 captures a first image before and a second image after the robot 220 and/or human operator 235 performs an action.

From stage 805, the picking system 120 proceeds to stage 810. At stage 810, one or more computing devices 400 determines whether the action was a success or a failure. For example, the computing devices 400 determine whether the item 335 was picked and/or the tote 240 was rearranged successfully. The computing devices 400 are configured to utilize an AI model to determine the success of the action. For example, the devices utilize a neural network that is trained to perform computer vision tasks. In an alternate embodiment, the human operator 235 manually determines whether or not the action was successful. From stage 810, the picking system 120 then proceeds to stage 815. At stage 815, the computing devices 400 attach a label to data about the action. The label corresponds to the success or failure of the action. In one embodiment, the computing devices 400 attach more than one label to the data where the labels correspond to more than one characteristic of the action. For example, the computing devices 400 add a label that denotes whether the robot 220 or the human operator 235 performed the action, what type of action was performed, and/or other details about the action.

After the data is labeled, the picking system 120 continues to stage 820. At stage 820, the labeled data is saved to the memory 410 of the computing devices 400. In one embodiment, the labeled data is saved on the memory 410 of one or more computing devices 400 on the robot 220, camera 230, and/or controller 305. In another embodiment, labeled data is saved on the memory 410 on the WMS 215. At stage 825, the local area network 210 and/or WMS 215 distribute the labeled data to one or more other computing devices 400 connected to the local area network 210 and/or WMS 215. In one embodiment, the local area network 210 sends the labeled data to the AI system 205. In another embodiment, the local area network 210 and/or WMS 215 send the labeled data to the computing devices 400 connected to each robot 220 in the picking system 120. In yet another embodiment, the local area network 210 sends the labeled data across the wide area network 140 to one or more computing devices 400 in another picking system 120 and/or facility 105.

At stage 830, the computing devices 400 trains the robots 220 using the labeled data. The computing devices 400 are configured to utilize a machine learning algorithm to train one or more AI models. The computing devices 400 are further configured to utilize one or more neural networks. For example, the computing devices 400 include one or more convolutional neural networks, recurrent neural networks, generative neural networks, discriminative neural networks, and/or another type of neural network. In one embodiment, the computing devices 400 utilize generative adversarial networks to train on the dataset. In another embodiment, convolutional neural networks are used to train on the data. In another embodiment, a transformer-based architecture is used to train on the data. In yet another embodiment, reinforcement learning paradigms can be used to train on the data. Multiple instances of the above discussed or other types of AI architectures may be used during training and inference stage.

In one embodiment, the AI system 205 trains one or more AI models and/or algorithms during stage 830. The AI system 205 subsequently trains the robots 220 by distributing the trained models and/or algorithms to the robots 220 through the local area network 210 and the WMS 215. In an alternate embodiment, one or more computing devices 400 on each robot 220 train one or more AI models and/or algorithms during stage 830.

In an alternate embodiment, the picking system 120 records and labels data of the robots 220 and/or cameras 230 performing actions on the totes 240 while the AI system 205 and/or other computing devices 400 continue to train an AI model using the labeled data. For example, the AI system 205 and/or other computing devices 400 train a model for identifying pickable totes 240; determining an estimate or probability of the tote 240 being pickable; determining path of the robot 220 to successfully pick and/or place items 335 in the tote 240; determining actions of the robot 220 to successfully rearrange items 335 in the tote 240; tracking the movement of the human operator 235 to pick, place, and/or rearrange items 335 in the tote 240; and/or performing other tasks while the picking system 120 records data of the robot 220 and/or human operator 235 performing related actions. The picking system 120 repeatedly updates the training data that the AI system 205 or other computing devices 400 use for training such AI models. In one embodiment, the picking system 120 utilizes human-in-the-loop (HITL) techniques during updates to training data. For example, the human operator 235 labels data, creates training examples, and/or participates in another way while one or more computing devices 400 trains an AI model.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Algorithm" generally refers to a sequence of instructions to solve a problem or to perform a task, such as a calculation. Typically, algorithms are implemented on computers. An algorithm on a computer may be used to automate a desired process or task on that computer or across multiple computers and/or other devices. As examples, a computer may utilize an algorithm to make a prediction based on data, control a robotic device to move along a desired path, and/or calculate the solution to an equation. A human may determine the instructions of an algorithm and program the algorithm onto a computer or other device. In some cases, a computer or other machine may determine at least part of an algorithm. For example, an artificial intelligence system may determine an algorithm for performing a desired task. Additionally, algorithms, such as machine learning algorithms, may be utilized to teach an artificial intelligence system to create new algorithms or improve existing algorithms for performing desired tasks.

"And/Or" generally refers to a grammatical conjunction indicating that one or more of the cases it connects may occur. For instance, it can indicate that either or both of the two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Artificial intelligence" or "AI" generally refers to the ability of machines to perceive, synthesize, and/or infer information. AI may enable a machine to perform tasks which normally require human intelligence. For example, AI may be configured for speech recognition, visual perception, decision making, language interpretation, logical reasoning, and/or moving objects. Typically, AI is embodied as a model of one or more systems that are relevant to tasks that a machine is configured to perform. AI models may be implemented on a device, such as a mechanical machine, an electrical circuit, and/or a computer. AI models may be implemented in an analog or digital form and may be implemented on hardware or software. The implementation of AI may also utilize multiple devices which may be connected in a network.

"Bin" or "Tote" generally refers to a container or structure that can store or support physical objects. In one embodiment, a bin refers to a container, surface, or structure that is used in a picking system. For example, a bin may be a basket, box, crate, pallet, vehicle, conveyor, shelving structure, storage device, table, and/or a stationary surface. A bin may define an opening or have one or more unclosed sides to allow items to be added to or removed from the bin.

"Camera" generally refers to a device that records visual images. Typically, a camera may record two- and/or three-dimensional images. In some examples, images are recorded in the form of film, photographs, image signals, and/or video signals. A camera may include one or more lenses or other devices that focus light onto a light-sensitive surface, for example a digital light sensor or photographic film. The light-sensitive surface may react to and be capable of capturing visible light or other types of light, such as infrared (IR) and/or ultraviolet (UV) light.

"Computer" generally refers to any computing device configured to compute a result from any number of input values or variables. A computer may include a processor for performing calculations to process input or output. A computer may include a memory for storing values to be processed by the processor, or for storing the results of previous processing.

A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network interface to perform various network communications upon request. The network interface may be part of the computer, or characterized as separate and remote from the computer.

A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the Internet. Thus, a computer may include one or more physical processors or other computing devices or circuitry, and may also include any suitable type of memory.

A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer.

The concept of "computer" and "processor" within a computer or computing device also encompasses any such processor or computing device serving to make calculations or comparisons as part of disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible.

Multiple computers or computing devices may be configured to communicate with one another or with other devices over wired or wireless communication links to form a communication network. Network communications may pass through various computers operating as network appliances such as switches, routers, firewalls or other network devices or interfaces before passing over other larger computer networks such as the internet. Communications can also be passed over the communication network as wireless data transmissions carried over electromagnetic waves through transmission lines or free space. Such communications include using WiFi or other Wireless Local Area Network (WLAN) or a cellular transmitter/receiver to transfer data. Such signals conform to any of a number of wireless or mobile telecommunications technology standards such as 802.11a/b/g/n, 3G, 4G, and the like.

"Computer Vision" generally refers to the ability of a computer to obtain information from images and/or videos. Computer vision may perform similar tasks as in a human visual system, for example recognizing objects, tracking motion of objects, determining three-dimensional poses, determining three-dimensional shapes, and/or detecting visual events. A computer or other device may use computer vision to analyze image and/or video data recorded by a camera and/or vision system. In some embodiments, computer vision utilizes artificial intelligence to perform tasks. For example, computer vision may involve one or more artificial neural networks that are trained to obtain certain information from given images and/or videos.

"Controller" generally refers to a device, using mechanical, hydraulic, pneumatic electronic techniques, and/or a microprocessor or computer, which monitors and physically alters the operating conditions of a given dynamical system. In one non-limiting example, the controller can include an Allen Bradley brand Programmable Logic Controller (PLC). A controller may include a processor for performing calculations to process input or output. A controller may include a memory for storing values to be processed by the processor, or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller or characterized as separate and remote from the controller. A controller may be a single, physical, computing device such as a desktop computer, or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus, a controller may include one or more physical processors or other computing devices or circuitry and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using Wi-Fi or other Wireless Local Area Network (WLAN) or a cellular transmitter/receiver to transfer data.

"Conveyor" is used in a broad sense to generally refer to a mechanism that is used to transport something, like an item, box, container, and/or SKU. By way of non-limiting examples, the conveyor can include belt conveyors, wire mesh conveyors, chain conveyors, electric track conveyors, roller conveyors, cross-belt conveyors, vibrating conveyors, and skate wheel conveyors, to name just a few. The conveyor all or in part can be powered or unpowered. For instance, sections of the conveyors can include gravity feed sections.

"Convolutional Neural Network" or "CNN" generally refers to an artificial neural network wherein one or more neurons in at least one layer of the artificial neural network perform a mathematical convolution on an input to that layer. As examples, CNNs are used for identifying objects in an image, tracking an object in a video, classifying images, identifying words in speech, understanding meaning from text, generating text, generating images, and/or performing other tasks. In some cases, a CNN more accurately generates, analyzes, and/or performs other tasks related to images and video than other types of neural networks. In one example, the neurons of each layer in a CNN are fully connected such that each neuron of one layer is connected to every neuron of neighboring layers. In some cases, the CNN includes features to mitigate negative effects of a fully connected neural network, such as overfitting data.

"Discriminative Network" or "Discriminator Network" or "Discriminator" generally refers to a neural network that evaluates outputs from another neural network in comparison to information from a training dataset. In one embodiment, the second neural network is a generator network. During evaluation, the discriminator may attempt to distinguish the output of the generator network from information obtained from the training dataset. The discriminator may also send information to the generator network based on the evaluation of the output of the generator network.

"End of Arm Tool" (EoAT) or "End Effector" generally refers to a device at the end of the robotic arm that is designed to interact with the environment. The nature of this interaction of the device with the environment depends on the application of the robotic arm. The EoAT can for instance interact with an SKU or other environmental objects in a number of ways. For example, the EoAT can include one or more grippers, such as impactive, ingressive, astrictive, and/or contiguitive type grippers. Grippers typically, but not always, use some type of mechanical force to grip objects. However, other types of interactions, such as those based on suction or magnetic force, can be used to secure the object to the EoAT. By way of non-limiting examples, the EoAT can alternatively or additionally include vacuum cups, electromagnets, Bernoulli grippers, electrostatic grippers, van der Waals grippers, capillary grippers, cryogenic grippers, ultrasonic grippers, and laser grippers, to name just a few.

"Epoch" generally refers to one pass through a full training data set during training of an artificial intelligence (AI) model. A machine learning algorithm may handle the training data over multiple iterations in order to complete an epoch. In one example, the training data is divided into batches, and an epoch is completed after each batch has passed through the machine learning algorithm. In another example, the machine learning algorithm completes an epoch in one iteration. An AI model that is trained for a greater number of epochs is typically more accurate than an AI model trained for fewer epochs. Conversely, training an AI model for a large number of epochs causes the model to overfit the training data in some cases.

"Generative Adversarial Network" or "GAN" generally refers to a type of machine learning framework wherein two neural networks compete against each other. One neural network generates candidates for output and another neural network evaluates the candidates based on a training dataset. In one embodiment, one of the neural networks integrates or is replaced with manual inputs from a human operator. The training dataset may train the GAN to produce a variety of outputs. For example, the GAN may be configured to generate images, text, translations of text and images, sequences of movement, 3-dimensional objects and positions, and/or predictions of video.

"Generative Network" or "Generator" generally refers to a neural network that generates candidates as outputs. As examples, the output candidates are images, videos, speech, text, and/or instructions for a machine. The generator is configured to produce outputs that are similar to or indistinguishable from information obtained from a training dataset. In some cases, the outputs of a generator are evaluated by another neural network, for example a discriminator network. In one embodiment, the generator is given random data as input. The generator may perform operations on the input data. In some cases, the generator also receives information from a discriminator network that is used to train the generator and modify the operations of the generator.

"Human-in-the-loop" or "HITL" generally refers to the inclusion of human interaction within simulations, modeling, and/or other processes performed by a computer. In the context of machine learning, HITL typically refers to using humans to influence decisions of a computer during training of an artificial intelligence (AI) model. Humans interact with the AI model at one or more instances during training or another part of the machine learning process. As examples, a human evaluates predictions from an AI model at certain intervals in the training process, evaluates predictions from an AI model if the confidence of the prediction is below a certain threshold, and/or labels data used for training the model. HITL can be used in both supervised and unsupervised machine learning.

"Input/Output (I/O) Device" generally refers to any device or collection of devices coupled to a computing device that is configured to receive input and deliver the input to a processor, memory, or other part of the computing device and/or is controlled by the computing device to produce an output. The I/O device can include physically separate input and output devices, or the input and output devices can be combined together to form a single physical unit. Such input devices of the I/O device can include keyboards, mice, trackballs, and touch sensitive pointing devices such as touchpads or touchscreens. Input devices also include any sensor or sensor array for detecting environmental conditions such as temperature, light, noise, vibration, humidity, and the like. Examples of output devices for the I/O device include, but are not limited to, screens or monitors displaying graphical output, a projecting device projecting a two-dimensional or three-dimensional image, or any kind of printer, plotter, or similar device producing either two-dimensional or three-dimensional representations of the output fixed in any tangible medium (e.g., a laser printer printing on paper, a lathe controlled to machine a piece of metal, or a three-dimensional printer producing an object). An output device may also produce intangible output such as, for example, data stored in a database, or electromagnetic energy transmitted through a medium or through free space such as audio produced by a speaker controlled by the computer, radio signals transmitted through free space, or pulses of light passing through a fiber-optic cable.

"Item" generally refers to an individual article, object, or thing. Commonly, but not always, items are handled in warehouse and material handling environments. The item can come in any form and can be packaged or unpackaged. For instance, items can be packaged in cases, cartons, bags, drums, containers, bottles, cans, pallets, and/or sacks, to name just a few examples. The item is not limited to a particular state of matter such that the item can normally have a solid, liquid, and/or gaseous form for example.

"Machine Learning" or "Machine Learning Algorithm" generally refers to a way of developing methods for performing tasks within artificial intelligence (AI) systems. Machine learning algorithms build models based on given sets of sample data. Using these models, a machine learning algorithm may make predictions or decisions about performing tasks and may improve the ability of an AI system to perform those tasks. Examples of machine learning include supervised learning, unsupervised learning, reinforcement learning, deep learning, and statistical learning. Machine learning algorithms can be implemented on a device, for example a computer or network of computers. Implementations of machine learning may also incorporate various types of models, including artificial neural networks, decision trees, regression analysis, Bayesian networks, gaussian processes, and/or genetic algorithms.

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random-Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM).

Memory can refer to Dynamic Random Access Memory (DRAM) or any variants, including Static Random Access Memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM).

Memory can also refer to non-volatile storage technologies such as Non-Volatile Read Access memory (NVRAM), flash memory, non-volatile Static RAM (nvSRAM), Ferroelectric RAM (FeRAM), Magnetoresistive RAM (MRAM), Phase-change RAM (PRAM), Conductive-Bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other non-volatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Model" generally refers to a representation of a system, process, and/or object. Models modify one or more inputs using equations and/or logical operations to produce one or more outputs. A variety of systems, processes, and objects can be represented by models, including networks of neurons in a brain. Some models do not exactly portray the system or process and are a generalized or estimated representation to a certain extent. Some models produce varying outputs in response to the same input. For example, a statistical model of a system may involve probabilistic distributions based on randomly generated numbers such that the output is random to a certain degree.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices. Computers coupled to a network may be referred to as "nodes" or as "hosts" and may originate, broadcast, route, or accept data from the network. Nodes can include any computing device such as personal computers, phones, and servers as well as specialized computers that operate to maintain the flow of data across the network, referred to as "network devices". Two nodes can be considered "networked together" when one device is able to exchange information with another device, whether or not they have a direct connection to each other. Examples of wired network connections may include Digital Subscriber Lines (DSL), coaxial cable lines, or optical fiber lines. The wireless connections may include BLUETOOTH®, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11(b), 802.11(g), or 802.11(n) to name a few). Wireless links may also include or use any cellular network standards used to communicate among mobile devices including 1G, 2G, 3G, 4G, or 5G. The network standards may qualify as 1G, 2G, etc. by fulfilling a specification or standards such as the specifications maintained by the International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced. Cellular network standards may use various channel access methods such as FDMA, TDMA, CDMA, or SDMA. Different types of data may be transmitted via different links and standards, or the same types of data may be transmitted via different links and standards. The geographical scope of the network may vary widely. Examples include a Body Area Network (BAN), a Personal Area Network (PAN), a Local-Area Network (LAN), a Metropolitan Area Network (MAN), a Wide Area Network (WAN), or the Internet. A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks. A network may utilize different communication protocols or messaging techniques including layers or stacks of protocols. Examples include the Ethernet protocol, the Internet protocol suite (TCP/IP), the ATM (Asynchronous Transfer Mode) technique, the SONET (Synchronous Optical Networking) protocol, or the SDE1 (Synchronous Digital Elierarchy) protocol. The TCP/IP Internet Protocol suite may include the application layer, transport layer, Internet layer (including, e.g., IPv6), or link layer.

"Neural Network" or "Artificial Neural Network" generally refers to a model composed of multiple nodes. Each node receives a signal from one or more inputs or other nodes. Each node may also perform an operation on the received signal. Each node then sends a signal to one or more other nodes or outputs. The nodes may be arranged in layers such that one or more signals travels across the layers sequentially. The neural network may be given data that trains the neural network. The neural network may be trained to perform a variety of tasks, for example to recognize objects in an image, recognize patterns in a sequence, replicate motion, and/or approximate a function.

"Neuron" or "Node" or "Artificial Neuron" generally refers to a computational model within a neural network that receives one or more inputs and produces an output. Typically, the model of a neuron applies weights to the one or more inputs and sums the weighted inputs. The model of a neuron may include one or more non-linear functions, for example sigmoid, piecewise, and/or step functions. Inputs to a neuron may be outputs from one or more other neurons in the neural network or may be inputs to the neural network as a whole. Similarly, outputs of a neuron may be inputs to one or more other neurons in the neural network or may be outputs of the neural network as a whole.

"Pallet" generally refers to a portable platform or other structure on which goods or items can be assembled, stacked, stored, packaged, handled, transported, and/or moved, such as with the aid of a forklift or pallet jack, as a unit load. Typically, but not always, the pallet is rigid and forms a horizontal base upon which the items rest. Goods, shipping containers, and other items are often placed on a pallet secured with strapping, stretch wrap, and/or shrink wrap. Often, but not always, the pallet is equipped with a superstructure. In one form, the pallet includes structures that support goods in a stable fashion while being lifted by a forklift, pallet jack, front loader, and/or other lifting devices. In particular, pallets typically include a top, load deck upon which items are stacked, a bottom, support deck that rests on the ground, and a spacer structure positioned between the load and support decks to receive the forks of the forklift or pallet jack. However, the pallets can be configured differently. For example, the term pallet is used in a broader sense to include skids that have no support deck. One or more components of the pallet, or even the entire pallet, can be integrally formed together to form a single unit. By way of non-limiting examples, these pallets can include stringer, block, perimeter, skid, solid deck, multiple deck board, panel-deck, slave, double-deck (or face), single-way entry, two-way entry, four-way entry, flush, single-wing, double-wing, expendable, limited-use, multiple-use, returnable, recycled, heat treated, reversible, non-reversible, and/or warehouse type pallets.

"Pathing" generally refers to the process of determining the course of an object that is being moved by a routing device. The routing device includes one or more conveyors, vehicles, mobile robots, human operators, and/or another means of transporting an object. Typically, pathing is used to determine how objects are routed between various stages of one or more processes in a facility. As examples, pathing is used to determine routing for order fulfillment, storage, packaging, unpackaging, inventory management, manufacturing, and/or assembling. Pathing is determined by one or more computers and/or controllers on the routing device, remote computers and/or controllers, a human operator, and/or other devices or operators.

"Pickable" generally refers to the quality of an object or a bin that contains the object to be picked by a robotic arm or other equipment. An object may be determined to be pickable if a manipulator or end of arm tool on a robotic arm or other equipment is capable of picking that object. For example, a claw on the end of a robotic arm is capable of grasping a certain pickable object. Conversely, various factors may cause an object to not be pickable, even if the equipment is typically capable of picking that object. In some examples, the object is oriented in an undesirable position or a path to the object is blocked by other objects or part of a container, and the object is determined to be unpickable. An object may be determined to be pickable through various means, for example through a computer vision system that captures and analyzes visual data about the object and/or through physical picking attempts by a robotic arm or other equipment.

"Picking" generally refers to grasping and/or retrieving one or more items from a receptacle. The receptacle may be a container or surface that supports or encloses items. For example, items can be picked from a basket, box, crate, pallet, vehicle, conveyor, shelving structure, storage device, or a stationary surface. Picking may be used to grasp or retrieve items in a variety of applications. For example, picking may be utilized for fulfillment of orders, storage, packaging, unpackaging, inventory management, manufacturing, or assembling. The geometry, rigidity, and other properties of the Items can vary, and a system may be configured to pick one or more types of items. Typically, picking may be performed automatically by a robotic arm or other robotic equipment.

"Placing" generally refers to releasing and/or setting down one or more items into a receptacle. The receptacle may be a container or surface that supports or encloses items. For example, items can be picked from a basket, box, crate, pallet, vehicle, conveyor, shelving structure, storage device, or a stationary surface. Typically, placing is performed automatically by a robotic arm or other robotic equipment. In some examples, placing is performed by a robot after a picking operation. For example, a robot may place an item into a bin after picking that item from a conveyor belt. Placing may be used to release or set items in a variety of applications. For example, placing may be utilized for fulfillment of orders, storage, packaging, unpackaging, inventory management, manufacturing, or assembling. The geometry, rigidity, and other properties of the Items can vary, and a system may be configured to place one or more types of items.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of 2200 Mission College Boulevard, Santa Clara, Calif. 95052, USA. In another example, the processor uses a Reduced Instruction Set Computing (RISC) architecture, such as an Advanced RISC Machine (ARM) type processor developed and licensed by ARM Holdings of Cambridge, United Kingdom. In still yet other examples, the processor can include a Central Processing Unit (CPU) and/or an Accelerated Processing Unit (APU), such as those using a K8, K10, Bulldozer, Bobcat, Jaguar, and Zen series architectures, supplied by Advanced Micro Devices, Inc. (AMD) of Santa Clara, California. Another example of a processor is an Application-Specific Integrated Circuit (ASIC). An ASIC is an Integrated Circuit (IC) customized to perform a specific series of logical operations for controlling the computer to perform specific tasks or functions. An ASIC is an example of a processor for a special purpose computer, rather than a processor configured for general-purpose use. An application-specific integrated circuit generally is not reprogrammable to perform other functions and may be programmed once it is manufactured. In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. An FPGA may be programmed to perform a specific series of instructions which may be retained in nonvolatile memory cells in the FPGA. The FPGA may be configured by a customer or a designer using a Hardware Description Language (HDL). An FPGA may be reprogrammed using another computer to reconfigure the FPGA to implement a new set of commands or operating instructions. Such an operation may be executed in any suitable means such as by a firmware upgrade to the processor circuitry. Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, and the unknown number may automatically change over time as well. The concept of a "processor" includes a device configured or programmed to make threshold comparisons, rules comparisons, calculations, or perform logical operations applying a rule to data yielding a logical result (e.g., "true" or "false"). Processing activities may occur in multiple single processors on separate servers, on multiple processors in a single server with separate processors, or on multiple processors physically remote from one another in separate computing devices.

"Recurrent Neural Network" or "RNN" generally refers to an artificial neural network wherein the outputs of one or more nodes affects one or more inputs to the same nodes. Some RNN's include memory to store various internal states and/or inputs. The memory of an RNN is stored within the RNN, stored in another neural network, and/or stored by another means. Typically, RNN's are used to perform tasks with inputs that have varying lengths. As examples, RNN's are used for identifying handwritten words, recognizing speech, generating speech, identifying actions in a video, predicting motion of an object, and/or performing other tasks. A neural network is considered fully recurrent if the outputs of all neurons in the network connect to the inputs of all neurons.

"Robotic Arm" or "Robot Arm" generally refers to a type of mechanical arm, usually programmable, with similar functions to a human arm. Links of the robot arm are connected by joints allowing either rotational motion (such as in an articulated robot) or translational (linear) displacement. The robot arm can have multiple axes of movement. By way of nonlimiting examples, the robot arm can be a 4, 5, 6, or 7 axis robot arm. Of course, the robot arm can have more or less axes of movement or freedom. Typically, but not always, the end of the robot arm includes a manipulator that is called an "End of Arm Tool" (EoAT) for holding, manipulating, or otherwise interacting with the cargo items or other objects. The EoAT can be configured in many forms besides what is shown and described herein.

"Routing" generally refers to the movement of objects along a determined path. Objects may be moved using any or a combination of conveyors, vehicles, mobile robots, human operators, or another means. The path may be determined by a computer or processor on the device moving the objects. Alternatively, the path may be determined by an external computer or network and communicated to the device moving the objects.

"Semi-Supervised Learning" or "Semi-Supervised Machine Learning" generally refers to machine learning wherein an artificial intelligence (AI) model is trained using a combination of labeled and unlabeled data. In one example, a majority of the training data is unlabeled data. Semi-supervised learning may be utilized when there isn't a sufficient amount of labeled training data available to be used in machine learning. In some cases, a machine learning algorithm adds imprecise and/or generalized labels to the unlabeled data set before training an AI model. For example, in contrast to receiving a more reliably and/or accurately labeled data set, a machine learning algorithm receives unlabeled data and adds less accurate and/or reliable labels to the unlabeled data.

"Server" generally refers to a computer or group of computers that provide(s) data to other computers. It may serve data to systems on a local area network (LAN) and/or a wide area network (WAN) over the Internet.

"Structured Data" generally refers to data that is stored in an organized format, for example in a table. Typically, structured data stores data in different fields and can be separated clearly into data elements within those fields. The fields may include various types of data, including both numbers and text strings. The data elements stored in fields may be formatted a specific way, such as phone numbers, directional vectors, dates, and/or identification numbers. In some cases, fields may store data elements with a varying format or length, for example names, locations, and/or numeric quantities. Structured data may be generated by humans and/or machines.

"Supervised Learning" or "Supervised Machine Learning" generally refers to machine learning wherein an artificial intelligence (AI) model is trained using labeled data. Supervised learning trains the AI model by relating features within the training data to the data labels. A model that is trained using supervised learning is configured to output one or more labels that describe data from one or more inputs.

"Synthetic Data" generally refers to data that is created via an algorithm, game engine, and/or other device. In some examples, synthetic data is used as a stand-in for real data, such as in machine learning, statistical calculations, and/or other applications. Synthetic data may include partial synthetic data, which includes synthetic and real data in combination. Alternatively, synthetic data may include full synthetic data, which includes only synthetic data.

"Testing" generally refers to the process of assessing the performance of a model. In the context of machine learning, testing is performed on an artificial intelligence (AI) model. The models are assessed by evaluating their outputs when given a set of testing data as input. Typically, testing may occur after the process of validation and may be done on one model that is selected during validation. In some cases, testing is the final step in the development of an AI model.

"Testing Data" generally refers to data that is used in the process of testing models. Typically, testing data is used for testing artificial intelligence (AI) models. Testing data may be a subset of a larger data set that is used for other parts of developing AI models. For example, one initial data set may be divided into testing data and training data for developing an AI model. Testing data may include information that is used as input to a model and may include information about the expected output of a model. Information about the expected output may be used to evaluate the performance of a model during the testing process.

"Training" generally refers to the process of building a model based on given data. In the context of machine learning, training is used to teach artificial intelligence (AI) models information from a dataset and to make predictions. During training, models are given training data as input and output predictions for a target based on the given data. The models may be adjusted based on the outputs to improve the quality of predictions for the target. For example, a machine learning algorithm may adjust parameters of a model based on differences between the model output and information from the training data. The target of the model predictions may be included in information from the training data. Training may involve multiple iterations of models making predictions based on the data. In some cases, the training process is repeated or continued after a validation process.

"Training Data" generally refers to data that is used in the process of training models. Typically, training data is used for training artificial intelligence (AI) models. Training data may be a subset of a larger data set that is used for other parts of developing AI models. For example, one initial data set may be divided into testing data and training data for developing an AI model. Training data may include information that is used as input for a model and may include information about the expected output of a model. Training data may also include labels on data to better identify certain expected outputs. Models may be evaluated and adjusted based on labels or other information from the training data during the training process.

"Unstructured Data" generally refers to data that is not stored in an organized or standardized format. Various forms of data may be unstructured, including data in text documents, videos, pictures, and/or audio recordings. Unstructured data may not be clearly separable into fields or into data elements and may consist as only general collections of data. Methods for obtaining and analyzing data from unstructured sources may be more complex than methods for obtaining and analyzing data from other source, such as from structured data sources.

"Unsupervised Learning" or "Unsupervised Machine Learning" generally refers to machine learning wherein an artificial intelligence (AI) model is developed based on unlabeled data. In unsupervised learning, the AI model learns from the input data by observing patterns and characterizes the data based on probability densities, combinations of input features, and/or other aspects of the patterns in the data. In some cases, the AI model is trained to mimic the input data, and an error is evaluated between the output of the model and the input data. Unsupervised learning is typically used to generate content. As examples, unsupervised learning is used to train an AI model to generate images, generate audio, write text, determine an action, and/or produce other outputs. Conversely, unsupervised learning is used to obtain information from data in some cases. As examples, unsupervised learning is used to train an AI model to cluster images into groups, cluster text passages into groups, identify anomalies in data, and/or recognize other characteristics of the data.

"Validation" generally refers to the process of evaluating the performance of a model after training. In the context of machine learning, validation is performed on an artificial intelligence (AI) model. The models are given a set of validation data and the outputs of models are evaluated. Validation may be used to select the most accurate models from multiple trained models. Validation may also be used to determine if additional training is needed to improve a model. In cases where additional training is used after the initial validation, additional validation may be used after that training. In some cases, validation is followed by a final testing process.

"Validation Data" generally refers to data that is used in the process of validation for models. Typically, validation data is used for validation of artificial intelligence (AI) models. Validation data may be a subset of a larger data set that is used for other parts of developing AI models. For example, one initial data set may be divided into validation data and training data for developing an AI model. Validation data may include information that is used as input for a model and may include information about the expected output of a model. Models may be evaluated based on information from the validation data during the validation process.

"Vision System" generally refers to one or more devices that collect data and form one or more images by a computer and/or other electronics to determine an appropriate position and/or to "see" an object. The vision system typically, but not always, includes an imaging-system that incorporates hardware and software to generally emulate functions of an eye, such as for automatic inspection and robotic guidance. In some cases, the vision system can employ one or more video cameras, Analog-to-Digital Conversion (ADC), and Digital Signal Processing (DSP) systems. By way of a non-limiting example, the vision system can include a charge-coupled device for inputting one or more images that are passed onto a processor for image processing. A vision system is generally not limited to just the visible spectrum.

Some vision systems image the environment at infrared (IR), visible, ultraviolet (UV), and/or X-ray wavelengths. In some cases, vision systems can interpret three-dimensional surfaces, such as through binocular cameras.

"Warehouse Management System" or "WMS" generally refers to a computer system and associated software that allow organizations to control and administer warehouse operations from the time goods or materials enter a warehouse, manufacturing plant, storage lot, and/or other inventory facility until the goods or materials move out of the facility. Operations managed by a WMS include, but are not limited to, inventory management, picking processes and/or auditing.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

| Reference Numbers | |
| --- | --- |
| 100 | multi-facility system |
| 105 | facility |
| 110 | first facility |
| 115 | second facility |
| 120 | picking system |
| 125 | first picking system |
| 130 | second picking system |
| 135 | third picking system |
| 140 | wide area network |
| 145 | server |
| 150 | routing system |
| 205 | artificial intelligence system |
| 210 | local area network |
| 215 | warehouse management system |
| 220 | robot |
| 225 | conveyor |
| 230 | camera |
| 235 | human operator |
| 240 | tote |
| 305 | controller |
| 310 | conveyor controller |
| 315 | camera controller |
| 320 | robot controller |
| 325 | operator camera |
| 330 | robot camera |
| 335 | item |
| 340 | loading tote |
| 345 | status monitoring tote |
| 350 | rearranging tote |

-continued

| Reference Numbers | |
| --- | --- |
| 355 | picking tote |
| 360 | placing tote |
| 365 | empty tote |
| 370 | pallet |
| 375 | tote storage |
| 380 | tote return |
| 385 | loading human operator |
| 390 | rearranging human operator |
| 400 | computing device |
| 405 | processor |
| 410 | memory |
| 415 | I/O device |
| 420 | network interface |
| 500 | flowchart |
| 505 | stage |
| 510 | stage |
| 515 | stage |
| 520 | stage |
| 525 | stage |
| 530 | stage |
| 535 | stage |
| 540 | stage |
| 545 | stage |
| 600 | flowchart |
| 605 | stage |
| 610 | stage |
| 615 | stage |
| 620 | stage |
| 625 | stage |
| 630 | stage |
| 635 | stage |
| 700 | flowchart |
| 705 | stage |
| 710 | stage |
| 715 | stage |
| 800 | flowchart |
| 805 | stage |
| 810 | stage |
| 815 | stage |
| 820 | stage |
| 825 | stage |
| 830 | stage |

What is claimed is:

1. A system, comprising:
a robotic station including a robot configured to pick from and/or place into a tote one or more items;
a robot camera positioned proximal to the robot to capture one or more images of the items in the tote;
a computer configured to determine if the tote is pickable by the robot based on the images from the robot camera;
an operator station located remote from the robotic station;
an operator camera located at the operator station to monitor the operator station;
wherein the computer is configured to determine when a human operator at the operator station is idle with the operator camera;
wherein the computer is configured to route the tote from the robotic station to the operator station when the human operator is idle and the tote is unpickable by the robot;
wherein the operator station is configured to facilitate manual rearrangement of the items in the tote by the human operator; and
wherein the computer is configured to route the tote back from the operator station to the robotic station after determining the items in the tote are pickable with the operator camera.

2. The system of claim 1, further comprising:

wherein the computer is configured to monitor tote rearrangement via the operator camera;

an input/output (I/O) device including an indicator of proper tote arrangement; and wherein the I/O device is configured to provide instructions for proper tote arrangement to the human operator.

3. The system of claim 1, wherein:

the computer includes an artificial intelligence (AI) system;

the AI system is configured to determine if the tote is pickable by the robot based on the images from the robot camera; and the AI system is configured to learn operations from captured image data.

4. The system of claim 3, wherein the AI system is configured to learn how to pick from and/or place into the tote the items based on the captured image data.

5. The system of claim 1, wherein:

the computer is configured to rank totes based on probability of successfully picking items from the totes; and the computer is configured to route totes to the robot based on the rankings.

6. The system of claim 1, further comprising:

a network; and wherein the computer is configured to distribute previously captured imaging to the robot via the network.

7. The system of claim 1, further comprising:

a second camera aimed towards the same items in the tote.

8. The system of claim 1, wherein:

the computer is configured to determine the items in the tote at the operator station are pickable with the operator camera; and the computer is configured to activate an indicator when the items in the tote at the operator station are pickable.

9. The system of claim 1, wherein:

the computer includes an artificial intelligence (AI) system;

the AI system is configured to learn from the manual rearrangement of the items in the tote by the human operator captured by the operator camera; and the computer via learning by the AI system from the manual rearrangement is configured to change operation of the robot to enhance picking of the items.

10. A method, comprising:

capturing an image of a tote with a robot camera positioned proximal to a robot at a robotic station;

determining the tote is unpickable by the robot based on the image with a computer;

monitoring a human operator at an operator station with an operator camera;

determining the human operator is idle at the operator station via the computer as a result of the monitoring;

routing the tote from the robotic station to the operator station in response to the determining the tote in unpickable and the determining the human operator is idle;

wherein the operator station is located remote from the robotic station;

wherein the operator station is configured to facilitate manual rearrangement of the tote by the human operator; and routing the tote from the operator station to the robotic station after the human operator manually rearranges the tote to be pickable.

11. The method of claim 10, further comprising:

wherein the tote contains one or more items; and picking at least one of the items in the tote with the robot.

12. The method of claim 10, further comprising:

determining a chance of success of the robot rearranging items in the tote is above a threshold with the computer; and attempting to rearrange the items in the tote using the robot before the routing the tote to the human operator.

13. The method of claim 10, further comprising:

determining the tote ranks ahead other totes with the computer based on probability of picking success; and routing the tote to the robot in response to the determining the tote ranks ahead other totes.

14. A method, comprising:

determining a first tote is unpickable by a first robot at a robotic station with a robot camera;

routing the first tote to an operator station in response to the determining the first tote is unpickable;

capturing one or more images of a human operator manually rearranging the first tote by hand with an operator camera at the operator station;

routing the first tote from the operator station to the robotic station after the human operator manually rearranges the first tote to be pickable;

distributing the images to one or more computers using a network;

training at least one artificial intelligence (AI) system on at least one of the computers to perform a manipulation of one or more items using the images; and rearranging the items in a second tote with a second robot based on the training.

15. The method of claim 14, wherein the rearranging of the items includes picking and/or placing the items in the second tote with the second robot.

16. The method of claim 14, further comprising routing the first tote to the human operator who is idle.

17. The method of claim 14, further comprising:

labeling the images associated with the manipulation with the AI system.

\*    \*    \*    \*    \*